(12) United States Patent
Hart, III et al.

(10) Patent No.: US 8,726,027 B2
(45) Date of Patent: *May 13, 2014

(54) METHOD AND SYSTEM FOR DATA DELIVERY AND REPRODUCTION

(75) Inventors: John J. Hart, III, Mashpee, MA (US); Richard B. LeVine, Marston Mills, MA (US); Andrew R. Lee, Marlborough, MA (US); Daniel G. Howard, Mashpee, MA (US)

(73) Assignee: SCA IPLA Holdings Inc., New York, NY (US)

( * ) Notice: Subject to any disclaimer, the term of this patent is extended or adjusted under 35 U.S.C. 154(b) by 936 days.

This patent is subject to a terminal disclaimer.

(21) Appl. No.: 12/238,730

(22) Filed: Sep. 26, 2008

(65) Prior Publication Data
US 2009/0049303 A1    Feb. 19, 2009

Related U.S. Application Data

(62) Division of application No. 09/826,157, filed on Apr. 4, 2001, now Pat. No. 7,447,907.

(60) Provisional application No. 60/194,452, filed on Apr. 4, 2000, provisional application No. 60/227,705, filed on Aug. 24, 2000.

(51) Int. Cl.
*G06F 21/00* (2013.01)

(52) U.S. Cl.
USPC .............................. 713/176; 726/30; 726/31

(58) Field of Classification Search
USPC ...................... 713/176; 726/30, 31
See application file for complete search history.

(56) References Cited

U.S. PATENT DOCUMENTS

| | | | |
|---|---|---|---|
| 5,748,734 A | 5/1998 | Mizikovsky | |
| 5,765,152 A * | 6/1998 | Erickson | ..................... 707/9 |
| 5,809,139 A | 9/1998 | Girod et al. | |
| 5,889,868 A | 3/1999 | Moskowitz et al. | |
| 6,101,213 A | 8/2000 | Van Allen | |
| 6,240,121 B1 | 5/2001 | Senoh | |
| 6,263,087 B1 | 7/2001 | Miller | |
| 6,598,162 B1 | 7/2003 | Moskowitz | |
| 6,611,607 B1 | 8/2003 | Davis et al. | |
| 6,737,957 B1 | 5/2004 | Petrovic et al. | |
| 6,801,999 B1 | 10/2004 | Venkatesan et al. | |
| 2001/0044899 A1 | 11/2001 | Levy | |

OTHER PUBLICATIONS

Koch et al., "Towards Robust and Hidden Image Copyright Labeling", Jun. 20-23, 1995, pp. 1-5.
RFC 1750, Dec. 1994, pp. 1-30.

* cited by examiner

*Primary Examiner* — Michael Pyzocha
(74) *Attorney, Agent, or Firm* — Oblon, Spivak, McClelland, Maier & Neustadt, L.L.P.

(57) ABSTRACT

Methods and apparatus for processing title data watermarked with a code. At least a portion of the title data may be watermarked at a plurality of locations within the title data with customer information data, so that the title data provided to a customer includes the watermark information. To obtain the code from the watermarked title data, watermarking information associated with the watermarked title data is first received. The watermarking information identifies a plurality of locations and a number to frequency modulation relationship at each of the locations. A different modulation scheme may be used at each location. The watermarked title data is demodulated at each of the plurality of placement locations based on the number to frequency modulation relationship. The code is then generated from the demodulated watermarked title data. A verification indication is output based in part on the generated code.

13 Claims, 12 Drawing Sheets

METHOD AND SYSTEM FOR DATA DELIVERY AND REPRODUCTION

CROSS-REFERENCE TO RELATED APPLICATIONS

This Application is a Divisional of U.S. application Ser. No. 09/826,157 filed on Apr. 4, 2001, which claims priority to Provisional Application Nos. 60/194,452 and Application 60/227,705 filed on Apr. 4, 2000 and Aug. 24, 2000 respectively, all of which we hereby incorporated by reference.

BACKGROUND OF THE INVENTION

1. Field of the Invention

This application relates to a highly secure data delivery system and method for distribution of title data, on demand, and a method and system for the encryption, storage, preview, selection, retrieval, watermarking, decryption and delivery to remote locations, of digital title data stored at a central storage facility, and in particular, music recordings, movies, software, and the like.

2. Description of the Related Art

The manufacturing and distribution of movies, music and software for home enjoyment is quickly becoming one of the larger industries in the world. For example, with the Internet (the "net"), there are now companies that allow a user to order over the net and have shipped any of music, video or software titles that the business-to-consumer retailer has in stock. A user can simply go to a website, provide the necessary credit card information and shipping information, and the retailer will ship the requested titles to the user's home. However, shipment that is not at an increased fee can take on average two to three days, and even longer if to a remote location. In addition, these retailers do not always have every title that a user wishes to order, in stock. Therefore, shipment can take longer. Alternatively, the customer will have to pay additional shipping costs to get the title faster.

There are other retailers that also strive to offer customized titles to a customer. For example, there are retailers that offer customized CDs to a customer through a web site, wherein a customer can access the company's website and request a customized CD with each title or track that the user selects. Nevertheless, the user must still wait on average two to three days for a CD to be shipped to the user. In addition, there may be a delay in manufacturing the CD prior to shipment, which will push out the shipment time to the user. Further, the customer who wants the CD quicker will have to pay additional shipping costs.

There also exists the more traditional industry of rental and sale of movies, CDs, software and the like at local retail establishments such as, for example, a movie on videotape at a local video retailer. Today, the most popular medium for distributing such movies may still be VHS videotapes, however digital video disks (DVDs) are quickly becoming very popular. Of course, renting or purchasing through a local retailer requires at least one trip to the local retailer. In addition, there is the possibility that the desired titled will not be in stock.

Yet another medium for distributing, for example, movies to a home is through cable or satellite television networks, which currently provide pay-per-view capabilities and some also offer video-on-demand services. Nevertheless, direct video distribution to the home is limited, for example, by the availability of select and limited titles at the pre-defined times. Pay-per-view services typically only offer a limited number of titles at the pre-defined times. Video on-demand is typically limited by the cable television provider's head end facilities, its infrastructure and capacity to store a number of titles. To rent or buy a movie today can still be a frustrating experience for a customer. For pay-per-view, the customer must rent the movie at the select times its local cable company offers the movie. In addition, video-on-demand is not yet available to a majority of the population. Therefore, for the consumer, the experience of renting or buying a movie often still requires that the customer visit a local video retail outlet. However, making a trip to the local retail store does not guarantee that the consumer will even find the title that they desire, and the consumer may either end up renting or buying an alternative title or not renting or buying anything at all. This is due, for example, to the limited space for stocking many titles within the confines of the retail store. These stores can only stock a limited supply of titles for rental or purchase. In addition, the titles tend to be the most popular titles, and therefore the consumer may not be able to rent or purchase a particularly desired title if it is not a popular title.

BRIEF SUMMARY OF THE INVENTION

There is a need to watermark title data with customer information that cannot be removed from the title data, so as to deter copying of the title data once rented or purchased. Methods and apparatus for processing watermarked title data are provided.

In one aspect, the invention relates to a device, comprising a computer-readable medium and a processor. The computer-readable medium is configured to store watermarked title data, the title data being watermarked with a code. The processor is configured to extract the code from the watermarked title data on the computer-readable medium, by receiving watermarking information associated with the watermarked title data, the watermarking information identifying a plurality of placement locations and a number to frequency modulation relationship at each of the plurality of placement locations; demodulating the watermarked title data at each of the plurality of placement locations based on the number to frequency modulation relationship; and generating the code from the demodulated watermarked title data.

In another aspect, the invention relates to a method of processing title data watermarked with a code. The method comprises receiving watermarking information associated with the watermarked title data, the watermarking information identifying a plurality of placement locations and a number to frequency modulation relationship at each of the plurality of placement locations; demodulating the watermarked title data at each of the plurality of placement locations based on the number to frequency modulation relationship; generating the code from the demodulated watermarked title data; and outputting a verification indication based in part on the generated code. In yet another aspect, the invention relates to a computer-storage medium comprising title data that is watermarked with an identification code, the title data having at a plurality of locations the identification code modulated on the title data, with a different modulation scheme at each of the plurality of locations creating a random relationship between the identification code and modulation at each of the plurality of locations, and each of the plurality of locations being a random location within a group of available placement locations at which the title data has properties meeting at least one criterion.

DETAILED DESCRIPTION

In the following detailed description, reference is made to the accompanying drawings which form a part hereof, and which show by way of illustration a preferred embodiment in which the invention may be practiced. This embodiment is described in sufficient detail to enable one skilled in the art to practice the invention, and it is to be understood that other embodiments may be used and that changes may be made without departing from the spirit and scope of the illustrated embodiment of the invention. The following description is, therefore, not to be taken in a limiting sense, and the scope of the invention is defined only by the appended claims.

By way of example, an embodiment of the invention will be illustrated in terms of a system for delivering title data, such as, full-length movie title data, audio title data, and software title data in multiple formats and on multiple media to a remote location or to a customer. It is to be appreciated that the system for which an embodiment is illustrated may be used in a number of different applications which would be obvious to one of skill in the art.

System Overview

Figure 1:
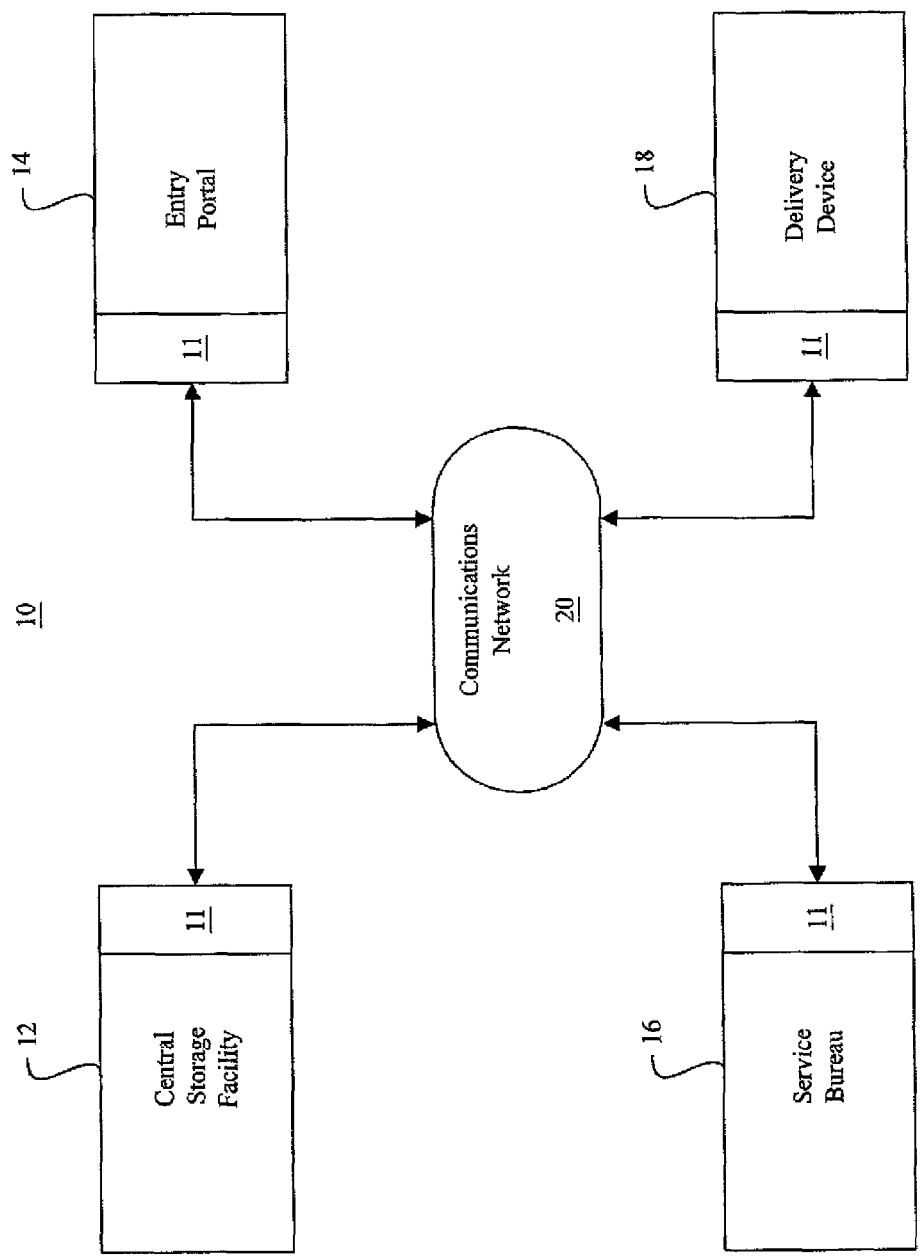
FIG. 1 illustrates an embodiment of a system for providing title data according to the invention.

By way of example, a system for capturing, storing, encrypting, previewing, selecting, decrypting, watermarking and delivering title data, such as, full-length movie title data is shown in FIG. 1. The system 10 includes a service bureau 16, a central storage facility 12, an entry portal 14 and a delivery device 18. The central storage facility in one embodiment can be located at a central location for serving a plurality of delivery devices over a wide geographic area. However, it is also to be appreciated that the central storage facility may comprise a plurality of such facilities that are mirrored and are located at a plurality of locations to service any geographic area. It is also to be appreciated that the delivery device can be a plurality of delivery devices located at a plurality of locations such as, for example, at a local retail store. Each of the service bureau, the central storage facility, the entry portal and the delivery device are coupled together through a communications network which is preferably a fiber optic network capable of delivering large volumes of data at a high speed. It is to be appreciated, however, that the communications network can take other forms such as other land-wire type connections including a T1 line, a digital-subscriber line (DSL), an ISDN, a satellite communication system, a wireless communication system, other known communication mediums, and combinations thereof.

The system 10 of FIG. 1 can be used, for example, to deliver on-demand, full-length motion picture titles at a delivery device, which can be written onto a physical medium, such as a CD-R, a digital-video disk (DVD), and purchased by a customer, preferably within an hour. It is to be appreciated, however, that any title such as a music title, a software title, a game title, and the like can be provided by this embodiment of the invention. It is also to be appreciated that the title can be provided on any medium such as a DVD, a CDOR, a mini-disk, a Flash RAM, a VHS tape, a Beta tape, a digital Beta tape, or any other medium known to one of skill in the art. It is further to be appreciated that the title data need not be provided on a medium, but rather may be provided, for example, over an on-demand network to a customer's home for immediate enjoyment by the customer, or even over the communications network for burning of a selected medium by the customer.

One advantage of this embodiment of the invention is that the plurality of delivery devices, which can exist, for example, in a retail video store should not run out of any movie that is available via the system, whether it be for a rental or for sale. Another advantage of this embodiment of the invention is that it allows each delivery device such as a retail store to operate without having to maintain a large inventory of title data. For example, the system of the invention allows the delivery device as will be discussed in detail infra, to keep, for example, the top 100 DVD titles in a local cache at the delivery device, and to request any other titles data from the central storage facility.

Generally speaking, the system 10 illustrated in FIG. 1 permits a consumer (not illustrated) to preview a title, to select a title, and to order a title for rental or purchase with the entry portal 14, for reproduction, for example, with the delivery device 18, whereby information necessary for the preview or reproduction of the title data is communicated in a highly secure manner over the communications network 20. The title data is either stored locally at the delivery device in an encrypted and encoded format, or the title data is stored at the central storage facility 12 in the encrypted and encoded format and is communicated to the delivery device over the communications network in a highly secure fashion. As will be discussed in detail infra, another advantage of this embodiment of the invention is that the system is highly secure and includes a plurality of security features that prevent anyone who has not purchased a title or who does not have sufficient privileges, from breaking into the system and decrypting or decoding the title data. As will also be discussed infra, the system includes a watermarking device and method of watermarking, that watermarks the title data, that is purchased or rented via the system with encrypted customer information data, and that cannot be defeated without substantially destroying the title itself. Accordingly, another advantage of the system and method of the invention is that any title purchased or rented through the system will be watermarked with encrypted customer data, which is a deterrent to the purchaser allowing illegal copies of the title data to be made.

This embodiment of the system 10 of the invention will also have the capability of producing artwork for packaging of the title which is either being sold or rented. For example, the artwork may be printed onto the media itself, onto packaging for the media, onto a label for the media, or may be in the form of a bar code or in any other encoded format, or any other packaging known to one of skill in the art. The artwork can include, for example, customer or retailer identification data, graphics data, or any other identifying indicia known to those of skill in the art. The artwork, like the title data itself, can be stored either locally at the delivery device 18 or at the central storage facility 12 and transmitted by the communications network 20 to the delivery device. As will also be described in detail infra, this embodiment of the invention can include an accounting system which monitors the distribution and manufacturing of all title data, for a proper accounting of royalty information to copyright holders, and for security reasons to be discussed in detail infra.

The Communications Network

It is to be understood that anywhere in this specification where there is described transfer of data over the communications network 20, that such transfer of data is an authenticated transaction that includes a level of network authentication that can be attained, for example, using commercially available security products known to those of skill in the art. It is to be understood that each device that communicates over the communications network includes an Authentication Interface (AI) 11, known to those of skill in the art. It is to be understood that an authenticated transaction is one in which a requesting device is positively identified by the device receiving the request, and wherein the communications network is a secure communications network. It is also to be understood that each such transaction over the communications network is tied to a unique identifier, that can later be used to audit each step in the authenticated transaction process.

It is to be appreciated that the communications network is preferably a high band width communications network, particularly between the central storage facility 12 and the delivery device 18. The communications network is preferably a high-speed Ethernet network, such as a giga bit copper network. For example, the communications network of the invention preferably has the capacity to transfer a data stream at a speed of up to 100 mb/sec. to transfer, for example, a MPEG-2 encrypted, compressed title data. Such a system can transfer a 1.5 GB compressed movie title in less than 10 minutes. The servers for such a system would have terabytes of storage to accommodate movie titles.

The Service Bureau

Figure 2:
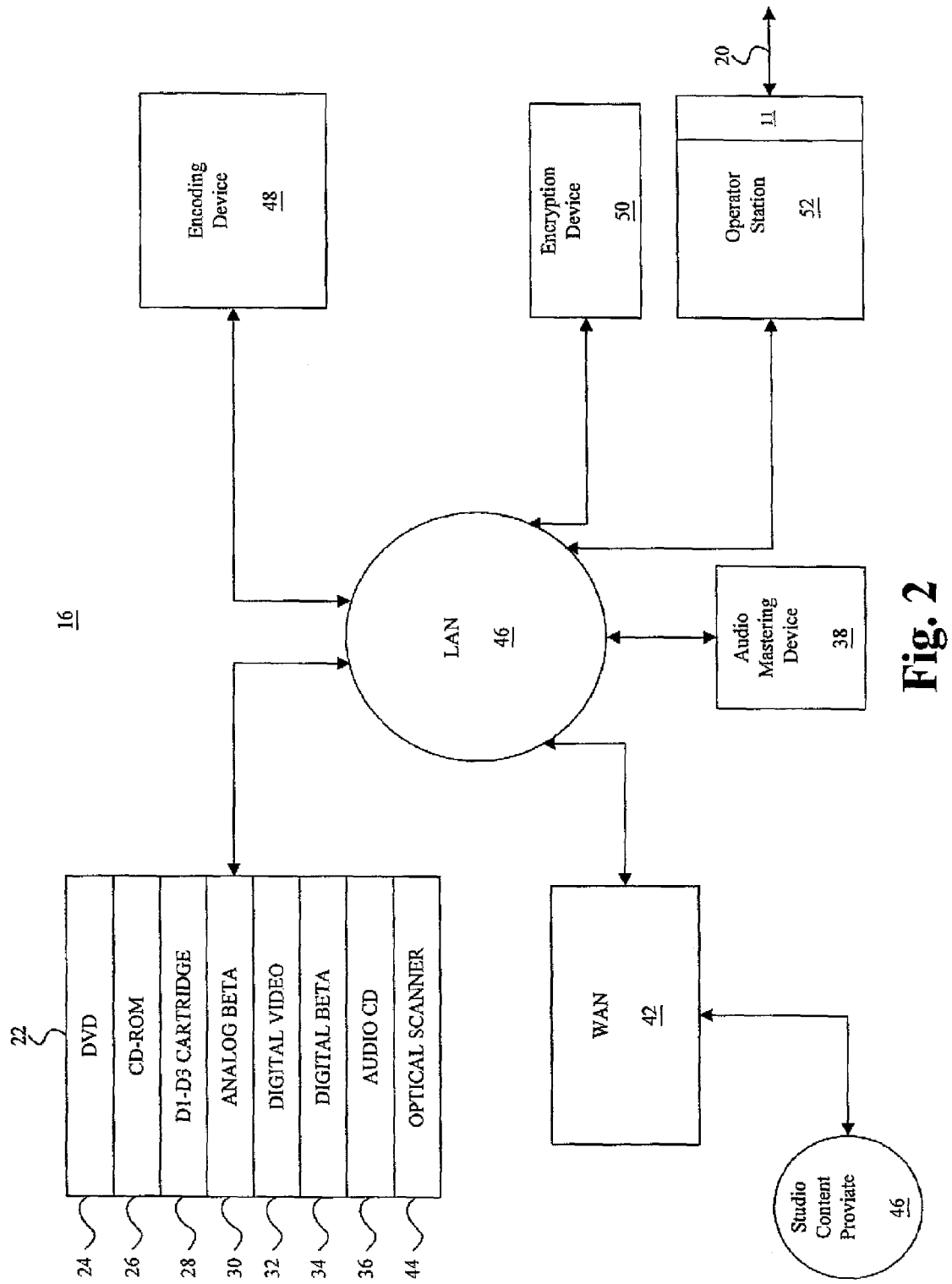
FIG. 2 illustrates a functional block diagram of an embodiment of a service bureau facility of the system of FIG. 1.

Referring to FIG. 2, there is illustrated a functional block diagram of one embodiment of the service bureau facility 16, which captures the plurality of title data that is ultimately provided to the delivery device. The title data includes, for example, analog title data that is sampled and converted to digital title data, digital title data and graphics data that may be, for example, scanned and converted to digital data. In particular, the title data may include audio data, full-length movie title data, software data and graphics data.

The service bureau 16 includes a plurality of media reading devices 22 that capture the title data for the plurality of titles. For example, the plurality of media reading devices may include digital source readers such as a DVD reader 24, a CD-ROM reader 26, D1-D3 readers 28, a digital video source reader 32, a digital Beta source reader 34, an audio CD reader 36, a CDR reader, and the like. The media reading devices may also include analog reading devices such as, for example, a tape player for audio, a VHS tape reader, an analog Beta tape reader 30, and a laser disk reader for movie titles. The service bureau may also include an optical scanner 44 that, for example, scans artwork, or advertisement data, and the like, into the service bureau as digital data, for storage ultimately at the central storage facility 12. It is to be appreciated that the artwork or the advertisement data can also be created, for example, by a user at an operator station 52 to be discussed further infra, or provided over a wide area network 42 to be discussed infra.

The service bureau may also include an audio mastering station 38 that reads an analog audio signal and digitizes the analog signal at, for example, 44.1 Kbs and converts the analog audio signal into a digital audio data stream. The audio mastering station may also include multi-speed readers. The audio mastering station can condition the audio data into any selected format, such as, MP3, CD, and may also compress the audio title data according to audio compression formats known to those of skill in the art. The audio mastering station can also operate on digital audio title data received from the digital audio readers to format the digital audio title data into a selected format and to compress the digital audio title data. It is to be appreciated that the audio mastering station may also include digital audio reading devices such as a CD reading device or a CDR reading device.

The service bureau 16 also captures full-length movie title data from a studio content provider 40. The studio content provider may be any content provider, such as, Universal Studios, MGM, Time-Warner, and the like. In addition, the full-length movie title data may be provided in any number of formats including 16 mm file format, and reformatted for home television such as in VHS format or DVD format. In one embodiment of the service bureau, the service bureau may be coupled to the studio content provider 40 via a wide-area network (WAN) 42, so that the service bureau can receive the movie title data from the studio content provider. In addition, the service bureau may be tied into a subscriber network through the WAN, that automatically provides updated title data, such as, software title data.

The service bureau may also receive in addition to the full-length movie title data, movie preview title data, and graphics title data such as movie labels, movie artwork and the like, which can be in either digital or analog format. This additional data may also be provided to the service bureau 16 by the WAN 42 or may be read by one of the plurality of media reading devices 22. The service bureau may include, for example, an optical reader, such as, for example, an optical scanner 44 that can be used to scan the artwork for the movie or audio title data. If any of this additional material is in analog format, it is converted to a digital format to be stored in the central storage facility 12 and to be associated with the full-length movie title data. In particular, referring to FIG. 1, as will be discussed in greater detail infra, the movie artwork can be transferred from the central storage facility along with the full-length movie title data to the delivery device 18 for use in reproducing the movie artwork for the jackets or covers on the jewel case of, for example, a DVD. Also, as will be discussed in greater detail infra, the preview information can be previewed by a customer at the entry portal 14 as part of the process of viewing, selecting and ordering the full-length movie title data. As will be discussed in greater detail infra, a majority of the available full-length movie title data, preview title data, and artwork title data will be stored in the central storage facility in a relational database.

Once captured, any of the movie title data, the graphics data, the audio title data and the advertisement data is provided by a local area network (LAN) 46 to an encoding device 48, which may compress and/or encode the data into a selected format such as, for example, an MPEG-2 format for the full-length movie title data. It is to be appreciated that the title data can be encoded in any format such as, for example, MPEG-1, MPEG-2, JPEG, and the like, by the encoding device. A JPEG graphic compression may be used, for example, on the graphic title data.

In one embodiment of the service bureau 16 and the system 10 of the invention, the full-length movie title data is demultiplexed into separate encoded audio and video title data files. As will be discussed in greater detail infra, demultiplexing the title data, such as MPEG-2 formatted title data, into separate audio and video title data files, is a part of the security provided by the system 10 of the invention. An advantage of demultiplexing the title data at the service bureau is that only the secure database will know the relation between the plurality of audio data files and the video data files stored at the secure database, and therefore there is security provided by demultiplexing the movie title data into separate audio and video title data files. Another advantage of demultiplexing the title data at the service bureau is that the title data need only be demultiplexed into separate title data once at the service bureau, as opposed to if the title data were to be demultiplexed at, for example, the delivery device, then each time a title is ordered, it would have to be demultiplexed at the delivery device. In addition, as will be discussed infra, each of the audio title data and the video title data will be encrypted separately and provided with its own separate decryption key. Accordingly, another advantage of the system of the invention is that the encryption provided, for example, to a movie title is doubled, and therefore the security is at least doubled.

In another embodiment of the service bureau 16 and the system 10 of the invention, to be discussed infra, the title data can be broken up into a plurality of fragments or chunks, which can be put back together only if the relationships between the chunks are known, and the plurality of chunks can each be encrypted with each chunk having a corresponding decryption key. Accordingly, another advantage of the system of the invention is that the security can be further increased by dividing up the title data and encrypting the plurality of chunks of title data.

One embodiment of the encoding device is a power Mac-based compressor device such as the Minerva Compressionest. However, it is to be appreciated that any number of encoding devices can be used, such as, for example, an Avid Symphony media composer, or a Pinnacle Sonic Solutions. It is also to be appreciated that the encoding device can be any Mac, SEI, or PC-based device.

Figure 4:
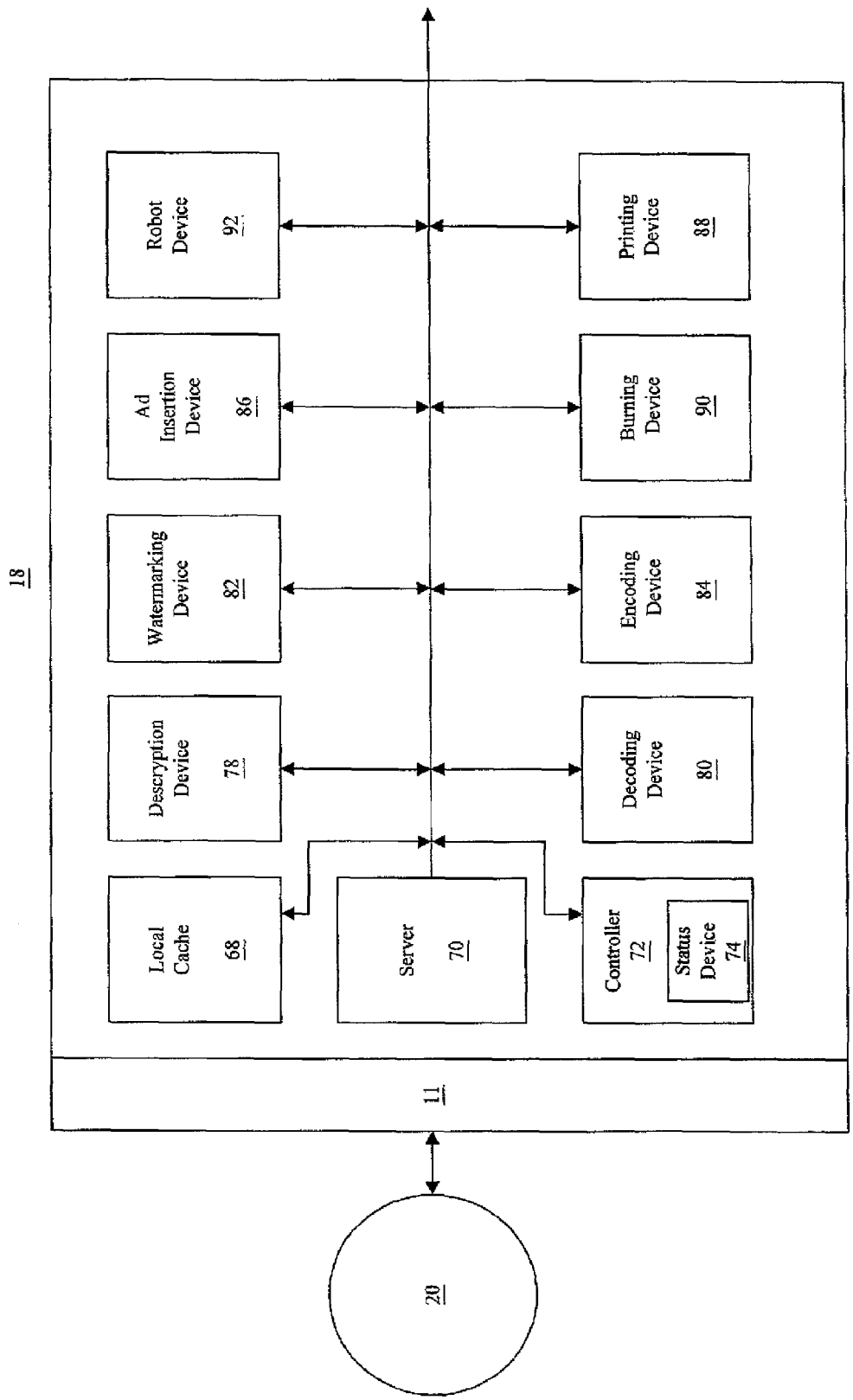
FIG. 4 illustrates an embodiment of a delivery device of the system of FIG. 1.

The title data such as the digital video and audio title data for a movie, if it is not already encoded, is encoded and compressed into, for example, an MPEG-2 format by the encoding device 48, which will have a corresponding decoding device 80, to be discussed in detail infra, in the delivery device 18 (see FIG. 4). The encoding device will provide an encoded title data which can be any of an encoded video title data, an encoded audio title data, an encoded audio only title data, or an encoded digital title data file such as a software data file. The encoded title data may be provided via the LAN 46 to an encryption device 50.

The encryption device 50 receives the encoded title data or title data that has not been encoded, and encrypts the title data using a National Security Agency (NSA) grade encryption process. The encryption device will encrypt the title data and provide at an output a corresponding encrypted title data and a corresponding decryption key for each encrypted title. It is to be appreciated that the decryption key will be preferably a 64-bit or higher decryption key provided by the NSA grade encryption process. It is also to be appreciated that in one embodiment of the system 10 as discussed above, for a full-length motion video title, both the audio title data and the video title data will be encrypted and provided with their own corresponding decryption key. Similarly, audio only title data and the digital title data for other titles will be encrypted and provided with a corresponding decryption key.

It is to be appreciated that in another embodiment of the system 10 and the service bureau 16 the title data, such as, the video title data, can be sliced up into a plurality of portions of the title, wherein each portion of the title is encrypted by the encryption device and is provided with its own corresponding decryption key. It is to be appreciated that for this embodiment, the slicing or dividing up of the title data need not be uniform or constant, and instead can be random. An analogy is be that the title is sliced up like a jigsaw puzzle or even like a glass breaking, and therefore even if someone were able to obtain all of the pieces of the puzzle or pieces of the title, they would still have to be able to put it together to reconstruct the title. It is to be understood that according to the invention, this is to be known as "chunked" segments of the title. It is to be appreciated that this breaking up of the title into chunks provides an additional measure of security with the method and system of the invention. In particular, someone trying to obtain an illegal copy of the title even if they were able to obtain all of the chunks of the title and even if they were able to decrypt each chunk of the title, would still need to know the association between each segment of the title, or they would have to spend an inordinate amount of time piecing the title back together. Moreover, it is to be appreciated that this added security can be further increased by randomly changing how the title is segmented or chunked, so that there can no predictive pattern as to how the title is divided up. Accordingly, for this embodiment of the service bureau 16 and the system 10 of the invention, it is to be appreciated that the encryption device and the service bureau will also provide in addition to the plurality of encrypted segments of the title and a corresponding decryption key for each segment, a correlation map between each of the encrypted segments of the title that provides the information needed to reconstruct the title, and which may also include the correlation between the video portion of the title and the audio portion of the title if the title is a movie title.

For digital title data such as software data, that is to be watermarked according to one embodiment of the invention to be discussed further infra, the encryption device 50 scans the digital title data and determines a plurality of locations where to insert information into the digital title data. For example, within a header of the title data, between frames of the title data, and the like. The encryption device then inserts a plurality of placeholder tags into the title data at the plurality of locations where the title data is to be watermarked. The encryption device then provides the title data with the inserted placeholder tags and a correlation map that indicates where in the title data the placeholder tags have been inserted, as an output of the encryption device to be stored at the central storage facility 12. As will be discussed in greater detail infra, the correlation map is provided along with the title data and the decryption key by the central storage facility to the delivery device, and is used by the delivery device to insert the customer information data at the locations where the placeholder tags has been added, to provide watermarked decrypted selected title data.

The service bureau 16 may also include a PC-based operator station 52 that in one embodiment may, for example, be a Windows NT-based station. The operator station may include a user interface that allows a user to interface with the different devices of the service bureau. For example, the operator station may be used as a controller to control the various devices of the service bureau. The operator station may also include a low-resolution encryption device that formats and compresses the preview title data into formatted, encoded preview title data, that is to be provided to the consumer via the entry portal. For example, the low-resolution encryption device may encrypt the preview title data so that the preview title data can be viewed by the consumer over a Web-based user interface at the entry portal and to use, for example, a Real Networks® player to preview the title data.

The operator station 52 may be used by the user, for example, to authorize the type of encoding to be done by the encoding device 48. Consumers may want a title delivered in different formats, and the operating station may allow a user at the service bureau to encode a title in a number of formats. For example, the operator station may be used to authorize that a particular title be encoded in, for example, both an MPEG-1 and an MPEG-2 format. With communication infrastructure as is today, it may be desirable to provide the title data in an MPEG-1 format so that it can be provided to the remote delivery device facility 18 for delivery to the consumer quicker than it would take to provide the title data in an MPEG-2 format. Nevertheless, if at the time of capturing, encoding and encrypting the title data, the title data is captured in both MPEG-1 and in MPEG-2 formats, then once the infrastructure improves, a consumer who has previously ordered and received the title in an MPEG-1 format, can request the title be supplied in an MPEG-2 format. With this embodiment of the system 10 of the invention, this could be done without the consumer having to again purchase the title.

Once encoded and encrypted, each title data is transferred via the communications network 20 to the central storage facility 12 for storage at the storage facility. The corresponding decryption key or decryption keys, such as, for the video and audio title data or for the plurality of chunks of the video title data, and the correlation map for the chunks of title data or the correlation map for the placeholder tags within the digital title data, are also transferred via the communications network to the central storage facility for storage. The graphics data or other digital data, such as, artwork for the title, the advertisement data and the like, is also transferred over the communications network to the central storage facility for storage. In addition, the preview title data is transferred over the communications network to the central storage facility for storage.

The Central Storage Facility

At the central storage facility 12, the plurality of title data is stored and cataloged, along with any of the associated digital data files containing artwork, the preview title data, the corresponding decryption key(s), and the correlation map. All of this data is stored in a relational database maintained by the central storage facility. In addition, a master data file index at the central storage facility is continually updated to reflect the availability of new title data files. As will be described in further detail infra, any of this data may be automatically sent over the communications network to any delivery device 18 to update a local cache 68 at the delivery device, depending on pre-selection criteria at the delivery devices, to be discussed in detail infra.

The central storage facility 12 is preferably located at a central location to service a large geographic area or region. However, those skilled in the art will readily recognize that components of the central storage facility do not necessarily need to be located at the same geographic location. In addition, those skilled in the art will readily recognize that the service bureau 16 may be located at the same location as the central storage facility or it may be located at another convenient location. For example, the service bureau may be located closer to a major content provider such as, for example, in Hollywood, Calif. Further, those skilled in the art will readily recognize that the central storage facility may be one facility or may be comprised of several mirrored facilities comprising substantially the same data and serving different geographical regions.

Figure 3:
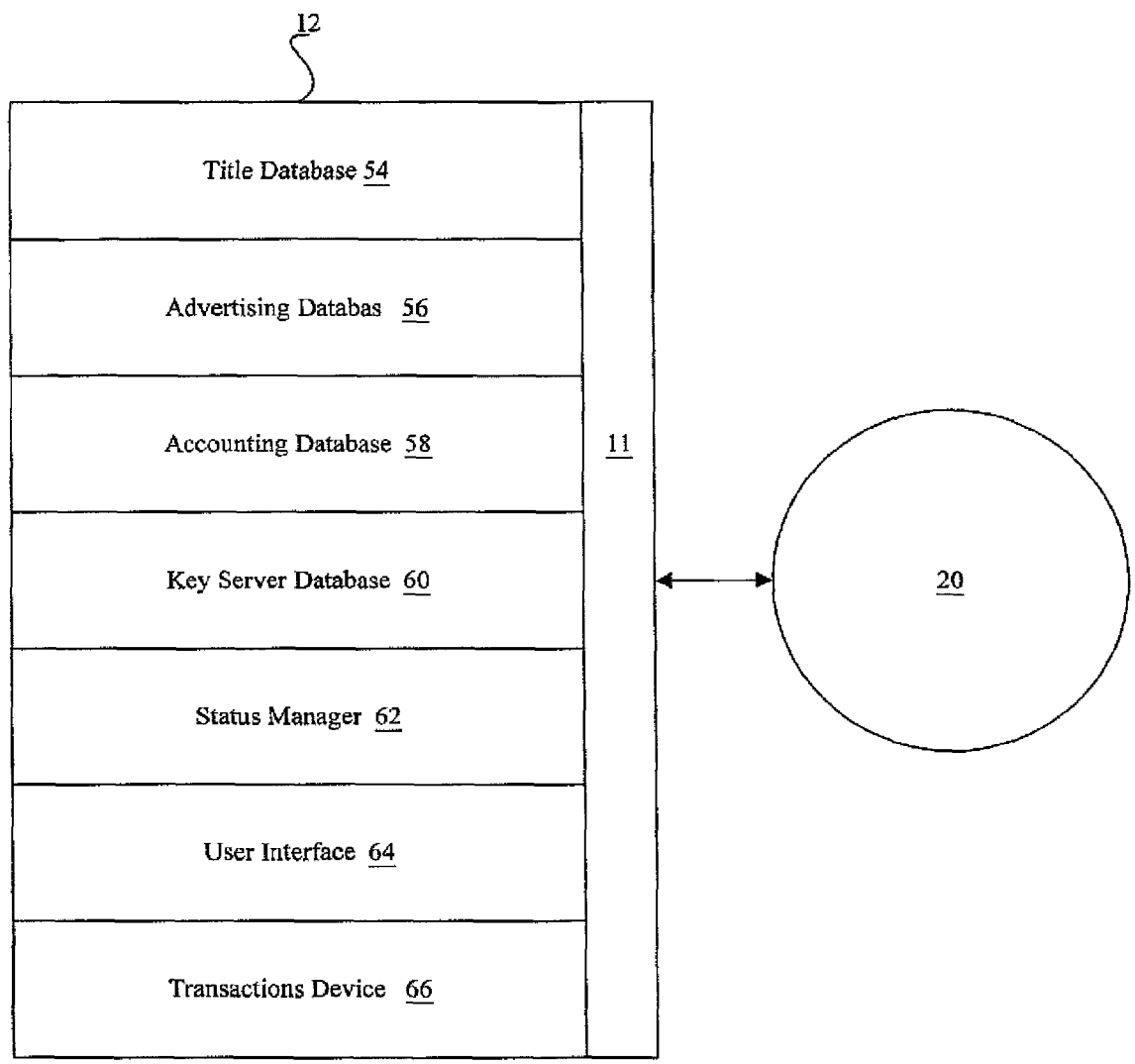
FIG. 3 illustrates a functional block diagram of a central storage facility of the system of FIG. 1.

FIG. 3 illustrates a functional block diagram of the central storage facility 12. As was discussed above, the encoded and encrypted title data is provided to the central storage facility for storage by the service bureau 16 over the communications network 20, along with associated decryption key(s). In addition, the correlation map, the digital data of e.g., graphics images, the advertisement data and the preview title data are also provided to the central storage facility, for storage. The encoded, encrypted title data which may include, for example, audio title data, both audio and video title data, and software title data is stored in a title database 54 of the central storage facility. In one embodiment of the central storage facility and system 10 of the invention, one copy of each title will be stored at the central storage facility. In addition, the formatted and compressed preview title data may also be stored in the title database and associated with the title data. In this embodiment of the central storage facility of the invention, a master file of the encoded, encrypted title data may be stored at the central storage facility for later comparison with a watermarked copy of the title data, for ultimate decoding of the watermarking of the watermarked title data, as will be discussed in detail infra. As will also be discussed in detail infra, upon receipt of selection information data and customer information data by the central storage facility over the communications network 20, the encrypted title data and the corresponding decryption key will be provided to a requesting delivery device 18 over the communications network.

The central storage facility 12 may also include an advertising database 56 that stores a plurality of advertising content data. The advertising database will also provide ads to the delivery device 18 via the communications network 20 along with the encrypted title data and the corresponding decryption key. The advertisements may, for example, be selected based upon the customer information data received by the central storage facility. In particular, the advertising database may select targeted ads based on demographics information provided within the customer information data. In addition, the advertising data may be tailored for specific consumers based upon customer information data. For example, the advertising database may select particular advertisements to be provided to the delivery device based upon a customer's prior history information, which may also be stored in the central storage facility in, for example, an accounting database 58, to be discussed in greater detail infra. The central storage facility also includes a key server database 60 that stores the plurality of decryption keys for the corresponding encrypted title data. As has been discussed above, the corresponding decryption key(s) are provided along with the encrypted title data to the delivery device when requested by a delivery device. In addition, the key server database can also store a watermarking key provided by the delivery device via the communications network, when the delivery device watermarks a decrypted copy of the selected title data, to be discussed in greater detail infra. This watermarking key can be used, for example, to determine the identity of a customer who originally purchased suspected copied title data. Accordingly, as will be discussed in greater detail infra, if a pirated copy or copies of a purchased medium is made, it can later be determined who was the purchaser of the original copy. Therefore, as will be discussed in greater detail infra, an advantage of an embodiment of the system of the invention is that it includes an anti-piracy deterrent and the key server database stores the corresponding watermarking keys to determine the consumer identity or information.

The accounting database 58 may also be coupled to a transaction device 66, to provide a process for electronic transactions, such as, credit card approval of a customer's order. The accounting database 58 is connected to the delivery device 18 and to the entry portal 14 through the communications network 20. All accounting and transaction information may therefore be recorded by the accounting database. The accounting database and the transaction device may account for each transaction at the delivery device or at the entry portal including, for example, revenue accounting, storing customer demographic information, computing royalties for each title ordered, and the like. The accounting database can collect and maintain customer identification data (ID) and demographic data for each customer which may include, for example, the name, address, telephone number, preferred contact procedure, major credit card numbers, a historical use profile, product preferences, types, frequency of ordering, and the like. An advantage of storing all the customer information at the central storage facility in the accounting database is that it allows customers the freedom to access the system from any entry portal 14, such as, in their own home, or co-located with a corresponding delivery device at, for example, a local retail establishment. In particular, the customer would only need to provide the information once and thereafter can access the system via any entry portal to, for example, rent or purchase full-length movie title data.

Upon authorizing a purchase or transaction, the accounting database 58 and transaction device 66 can issue an approval via a proprietary protocol for transaction authentication to the central storage facility 12, which can control the transfer to the delivery device of the encrypted title data, the corresponding decryption key(s), the advertising content data, and if, for example, the title data has been divided up into chunks or is software title data, the correlation map of the correlation between the chunks or the location of placeholder tags within the title data. The accounting database and transaction device may also provide for automatic payment of the royalties to the content provider over the communications network 20. In addition, the accounting database and transaction engine can update its own records for each transaction. The accounting database and transaction device may also, for example, bill the delivery device if the delivery device is located at a partner retail outlet. It is also to be appreciated that the accounting database 58 and transaction device 66 may also do any of the following: electronic funds transfer between any of a retail outlet containing a delivery device or a content provider, daily balancing of accounts, providing or determining pricing, providing account summaries or reports, monitoring product return and rental transaction closure including updating the customer financial information for all final or late charges, and the like.

The central storage facility 12 may also include a status manager device 62 that monitors a status of any transaction, as well as the status of the database. For example, the status manager device may be used by personnel (not illustrated) responsible for maintaining the database through, for example, a user interface (UI) 64 to start, stop or pause any transaction occurring, to perform general maintenance of the database, to control the order in which title data is provided to the communications network to fulfill an order, or for general status monitoring.

Delivery Device

Referring to FIG. 4, an embodiment of the delivery device 18 will now be described. The encrypted title data of the plurality of titles may be stored in a local cache 68 of the delivery device, or the encrypted title data may be transmitted by the central storage facility 12 to the delivery device over the communications network 20. The delivery device may include a server 70, which processes requests or orders for the title data received from the entry portals 14 over the communications network, and which locates the encrypted title data regardless of its location, i.e. whether the encrypted title data resides in the local cache or resides at the central storage facility. It is to be appreciated that the local cache can reside either in the delivery device or, for example, within the server, and that variations obvious to one of skill in the art are intended to be within the scope of the invention. The delivery device may also include a control process 72, which, for example, can be attached to the server, and which can be used to, for example, access and/or manipulate information in the accounting database, to control manufacture of the title data by the delivery device including an order of manufacture of the title data, and the like. The control process can, for example, include a local queue and status manager process 74 to accomplish the above. It is to be appreciated that although the control process is illustrated as residing within the delivery device, because the components of the system are all tied together, the process can reside anywhere within the system.

It is to be appreciated that the local queue and status manager can include a user interface allowing an employee at the delivery device or an employee of a local retail outlet partner housing the delivery device, to monitor and control the burning process. For example, an employee with appropriate privileges can through the user interface, control an order in which the decrypted selected title data are burned on selected media. For example, if it is apparent that an order needs to be filled quickly and that other orders can be delayed, an employee with appropriate privileges can modify the order to burn the urgent order first. Nevertheless, it is to be appreciated that with the security of the system and methodology of the invention, any employee will not ever have access to the decrypted selected title data or the decryption key so that no danger exists of any employee being able to steal or duplicate the title data.

The local cache 68 preferably allows for a small cache of, for example, the most demanded or ordered title files, to be maintained at the delivery device and managed by any of the local cache, the control process 72 or the server 70. In particular, the local cache can be managed according to selected criteria to, for example, hold the top 100 movies consistently ordered such that a majority of all movies provided by the delivery device come from the local cache, without having to be sent over the communications network from the central storage facility. Accordingly, it is to be appreciated that the controller may include statistical data and statistical methodology for determining the most frequently requested movies and new releases, such that the local cache can be utilized at its highest rate and so that only a minority of the title data need be provided from the central storage facility. In addition, the controller may, for example, keep statistics of local consumer tastes of most frequently requested titles, or may be configured to ensure that certain title data are never purged from the local cache, or may be configured to contain certain title data for a certain time period. Other variations to one of skill in the art such that the local cache can be utilized at its highest rate and the communications network can be utilized at a minimum, are intended to be within the scope of the invention.

It is also to be appreciated that the control process 72 including the local queue and status manager process 74 can, for example, update the accounting database at the central storage facility with, for example, royalty data. For example, as will be discussed in greater detail infra, upon burning of a desired medium or providing the title data to a consumer, the local queue and status manager may update the central database with the royalty information, and with the serial number associated with the title data indicating that this particular serial number has now been sold or rented.

The control process 72 including the local queue and status manager process 74 may use, for example, any of a number of processes to control the content stored in the local cache 68. A first such process, for example, is a cache-by-demand process, wherein least used titles fall off the end of the cache as new titles are added to the cache. This process may also include a step of moving a title ahead, or "freshening" in queue, in the order of the queue to regain its maximum duration place in the cache, once a title is requested and provided to a consumer.

Another process for managing the cache is a cache-by-predictive schedule process, wherein a manager or user of the system (or an heuristic predictive process) with certain privileges can specify, through the control process interface 72, selected criteria to cache the information by predictive schedule so that, for example, children's movies are cached in the local cache during a certain time of a day or for certain days or periods of a year, and so that, for example, adult films are cached in the local cache at other times within the day or certain days or periods within a year. The cache-by-predictive schedule process may also include a step of specifying the selected criteria to ensure that certain title data is always in the cache, even if it might otherwise be removed according to the cache-by-demand process. The heuristic predictive process can use a database of known patterns of purchase to stock the cache with no human interaction needed.

Still another process for managing the cache is a cache-by-real time-prediction process, wherein, for example, the status manager 62 at the central storage facility 12 in cooperation with the control process 72 within each delivery device 18, can capture a real time picture of the local cache at each delivery device, can track the plurality of local caches over time, and can, for example, on a regional basis, determine regional and/or local trends and preferences. The system can, for example, apply statistical analysis and predictive modeling, and can provide the title data to cache certain titles at the local cache of some of the plurality of delivery devices, based on these statistical patterns and modeling. The process may also include an auto-tune step whereby the cache can be auto tuned to account, for example, for connection speed, available space, and the like to make a best decision for storing content in a local cache. This best decision may include added intelligence within the status manager device 62 within the central storage facility that can learn, and improve over time, to manage the dynamics of the system and the plurality of local caches within corresponding delivery devices.

Referring again to FIG. 4, an embodiment of the delivery device 18 and a method of delivery title data will now be illustrated. As will be discussed in greater detail infra, once a customer decides to purchase or rent a title, the customer initiates a credit card secure transaction with the entry portal 14. The secure credit card transaction generates a unique customer identification (ID) data that will be a unique marker for each transaction. The customer ID data and the customer selection information data, which is information about which title data the customer has selected, is provided to the delivery device 18 via the communications network 20. The delivery device receives the customer ID data and the selection information data, and the local queue and status manager 74 of the control process 72, searches for the encrypted title. If the encrypted title is stored within the local cache 68, then it need not be requested from the central storage facility 12, and the decryption key is requested from the central storage facility. Otherwise, both the decryption key and the encrypted title are requested from the central storage facility.

It is important to note that the only time that a decryption key will be provided to the remote delivery device by the central storage facility, is when the credit card secure transaction has been approved, and the decryption and, if selected, the burning of the title is ready to begin. In particular, this embodiment of the system 10 ensures that the decryption key is provided only after the secure credit card transaction has occurred and is validated, and that the system provides the decryption key, and if necessary the encrypted title, so that the title can be decrypted on the fly and, if requested, a medium can be burned with the title, without the delivery device ever retaining the decryption key and preferably without the delivery device storing the unencrypted title data.

Therefore, it is to be appreciated that additional security is provided by the method and system of the invention, since neither the decryption key nor the unencrypted title are stored at the delivery device, and therefore can never be stolen or copied. It is also to be appreciated that the system 10 and method of the invention preferably manufacture the medium or deliver the encrypted title data and decryption key to the delivery device as close to the requested delivery time as possible, to provide the added security as well as to ensure that other jobs can be done first, if the title data has not been immediately requested by a consumer.

Upon receipt of the decryption key and the encrypted title data, the delivery device provides the encrypted title data and the decryption key to a decryption device 78, for decrypting the encrypted title data. As has been discussed above, the encrypted title data and the decryption key can include: for example, encrypted video title data and encrypted audio title data and the corresponding decryption keys for each of the encrypted video title data and the encrypted audio title data; encrypted audio title data such as, for example, a CD or collection of music title data and its corresponding decryption key(s); and encrypted software title data and its corresponding decryption key.

It is to be appreciated that in one embodiment of the system of the invention where the title data is movie data, the decryption key includes a corresponding decryption key for each of the video title data and the audio title data. It is to be appreciated that in another embodiment of the system of the invention, the decryption key for the video title data includes a corresponding decryption key for each segment or chunk of the video title, and that the correlation map for piecing back together the decrypted video title data is also provided by the central storage facility on a second, secure logical channel. It is further to be appreciated that this information is never written to disk, is ultra-volatile and has significant authentication requirements. It is also to be appreciated that for the software title data, the correlation map of the places where the placeholder tags have been inserted into the title data are also provided with the decryption key. The decryption device decrypts the encrypted title data including the chunks of title data, using the decryption key(s) and pieces back together the title data using the correlation map, to provide decrypted selected title data at its output. Alternatively, the decryption device pieces back together the encoded title data chunks and then decrypts the pieced back together encrypted title. For the case where the encrypted title data includes both encrypted video title data and encrypted audio title data, the decryption device will provide at its output both decrypted selected video title data and decrypted selected audio title data.

The delivery device 18 also includes a decoding device 80 that receives the decrypted selected title data and that may decode the decrypted selected title data. For example, as will be discussed in greater detail infra, the system and method of the invention includes a watermarking device 82 (see FIG. 5) and method for injecting the customer ID data into the decrypted title data and, if requested, onto a burned medium. In one embodiment of the watermarking device and method for watermarking, audio title data is operated on by the watermarking device to insert the customer ID data into the audio title data. For this embodiment, at least a portion of the decrypted selected audio title data may be decoded, for example, from an MPEG-2 format into a decoded format so that it can be provided to the watermarking device. Accordingly, the decoding device receives at least a portion of the decrypted selected audio title data, for example, where only a portion of the audio title data is to be watermarked or only portions of the decrypted selected audio title data are to be watermarked, so that the entire soundtrack need not be decoded, and decodes the portion(s) of the decrypted selected audio title data to provide at least a portion of decoded, decrypted selected audio title data to the watermarking device.

As will be discussed in greater detail infra, the watermarking device 82 receives the at least the portion of the decoded, decrypted selected audio title data, or at least a portion of audio title that has been decrypted, such as, CD-formatted audio data, and inserts or injects the customer ID data into the at least the portion of the decrypted selected audio title data to provide a watermarked portion of the decrypted selected audio title data. It is to be appreciated that with this watermarking device and method, an advantage of this embodiment of the method and system of the invention is that there is provided increased security including a unique anti-piracy deterrent that can be combined with the architecture of the system to provide a highly secure, on-demand system and method for delivering title data. Accordingly, it is to be appreciated that, for example, content providers will receive a value-added anti-piracy protection that can, for example, be used with existing anti-piracy measures to provide added security and anti-piracy deterrents.

The delivery device 18 also includes an encoding device 84, that receives at least the watermarked portion of the decrypted selected audio title data and that encodes the watermarked portion of the decrypted selected audio title data into the format that it was decoded from by the decoding device 80, e.g., MPEG-2 format. In addition, the decoding device combines the encoded portion of the watermarked decrypted selected audio title data with the remainder of the decrypted selected audio title data, to provide a complete watermarked decrypted selected audio title data.

For the case where the title data originally included both encrypted video title data and encrypted audio title data, the delivery device may also combine the watermarked decrypted selected audio title data with the decrypted selected video title data to provide a composite decrypted selected title data. In contrast, if the title data was originally audio only title data, then this step of combining the audio title data and the video title data need not be done.

It is also to be appreciated that if the title data is digital data and does not include audio title data, such as a software title, the title data can bypass both the decoding device 80 and the encoding device 84. In particular, as will be discussed in greater detail infra, where the title data is software title data, the software title data is decrypted with its corresponding decryption key by decryption device 78, and is provided to the watermarking device 82, to be watermarked according to another method of watermarking according to the invention. In particular, as will be discussed in greater detail infra, with this embodiment of the watermarking method of the invention, the watermarking device will receive the correlation map of locations in the software title data that the placeholder tags have been inserted, and will insert into each or some of the placeholder tag locations the customer ID data, to provide a watermarked software title data.

The delivery device 18 also includes an advertisement (Ad) insertion device 86 that either receives advertisement content data over the communications network 20 from the central storage facility 12 and/or selects advertisement content data from the local cache 68, and inserts the advertisement content data into the decrypted selected title data. In particular, the title data prior to being written to a selected medium or provided to the consumer, for example, over an on-demand network (not illustrated) may be merged with advertisement data, wherein the ads are selected by the system based on the customer's identity or, for example, other decision criteria for providing marketing and ad information. For example, the ad may be selected to be appropriate for the particular title, e.g., music, video, or software, to match the demographics of the customer as will be discussed in further detail infra, and/or tailored to the customer's prior purchasing patterns. For example, a marketing driven process can be stored and provided by the status manager device 62 at the central storage facility 12, and can be used to determine which ads get provided to the delivery device 18. Moreover, as will be discussed in further detail infra, the customer can be solicited as part of the ordering process, for further information from the customer, such as, which advertisements the customer would prefer, the customer's preferences, and the like. Still further, the system 10 via any of the status manager 62, the ad insertion device 86, the local status manager 74, can review and determine which ads have been provided to the particular customer in the past, and use this information to tailor future ad insertion into the selected title data. The ad insertion device then provides at its output the decrypted selected title data.

It is to be appreciated that the decrypted selected title data can be provided to the consumer in a plurality of different forms. For example, the delivery device might feed an on-demand network (not illustrated), wherein a customer can order the title data through the entry portal as will be discussed in further detail infra, and the decrypted selected title data can be provided to the user over the on-demand network. Alternatively, the decrypted selected title data can be provided to the consumer over the communications network 20 to be received by the consumer, for example, via the entry portal 14, so that the consumer can either enjoy the title data at the entry portal or, for example, burn a selected medium with a state-of-the-art burner interfaced to the entry portal. Still further, the delivery device can burn a medium selected by the customer with a burning device 90 at the delivery device, so that the customer can any of pick up the burned medium at a local retail outlet, have the burned medium delivered to the consumer via, for example, an overnight delivery service, or have the medium delivered with other goods or services such as, for example, a pizza where the delivery device is located within a local pizza store.

Where the consumer may elect to have the decrypted selected title data burned at the delivery device, the delivery device includes a burning device 90 and a printing device 88. The burning device can be any burning device known to one of skill in the art, such as a CD burning device, a CD-ROM burner, a DVD burner, and any other burning device that takes a digital data file and writes it to a selected medium. In addition, it is to be appreciated that the burning device can also be any analog burning device, that takes analog data and writes it to an analog medium such as a VHS tape recording device, and the like. It is to be appreciated that if an analog medium is selected, the digital data will be converted from digital format to analog format with a digital to analog converter (not illustrated) as readily known to those of skill in the art. As will be discussed in further detail infra, any of a content provider, a customer ordering a title through the entry portal, and/or a partner maintaining the delivery device, can choose to insert personalized content data either, for example, on the selected medium itself, on a label to be placed on the selected medium, or on a sleeve to be packaged with the burned medium, and the like. The printing device 88 receives the personalization data that is provided, for example, either from the local cache 68 or over the communications network 20 from the central storage facility 12, or from the entry portal 14 as will be discussed in further detail infra, and prints any of the burned medium, the label, and the packaging for the medium with any of, for example, graphics data, vendor identification data, customer information, a bar code, and the like. For example, the content provider may provide cover art to be burned on the sleeve with the title data, and the cover art may be stored in the central storage facility along with the encrypted title data and the decryption key, and when the title is ordered, the graphics data, the encrypted title data and the decryption key can be sent over the communications network to the delivery device for decrypting, watermarking, printing and burning.

It is to be appreciated that modifications to the burning device known to one of skill in the art are intended to be within the scope of the method and system 10 of the invention. For example, each burning device 90 may include a buffer that buffers the decrypted selected title data of a next title to be burned by the burning device, while the burning device burns a current title on a selected medium. Accordingly, it is to be appreciated that in one embodiment of the delivery device 18 and system of the invention, while the burning device is burning a current title on a selected medium, that the decryption device 78 and the watermarking device 82 can be operating simultaneously to decrypt and watermark the next title data, before it is provided to the burning device and buffered by the burning device. Further, it is to be appreciated that the delivery device can include more than one decryption device, watermarking device, burning device and printing device so that these devices can operate in parallel to provide a plurality of title data on a plurality of selected media, or to the consumer through an on-demand network or at the entry portal.

It is to be appreciated that in one embodiment of the method and system 10 of the invention, it is preferable to retain neither the decryption key nor the decrypted selected title data after the medium has been burned, or after the decrypted selected title data has been provided to the consumer. In particular, it is to be appreciated that the decryption, ad insertion, watermarking, and burning are done on the fly as close to the desired delivery time of the consumer as possible, so that there is no need to store the decryption key or the decrypted selected title data at the delivery device 18. An advantage of this embodiment is that it provides increased security, because the decrypted selected title data is never retained or stored at the delivery device and therefore cannot be copied or stolen. This security is in addition to the added security already provided by the watermarking of the decrypted selected title data, as will be discussed in further detail infra, and the splitting up and encrypting of the title data.

Once the desired medium has been burned or the title data provided to the consumer, the original encrypted title data is either retained by the local cache 68 to be stored and handled according to the criteria discussed above, or retained by the central storage facility 12. It is to be appreciated that once the decrypted selected title data has been burned onto the desired medium or provided to the consumer, the central storage facility accounting database 58 is updated with a transaction ID, such as, a serial number and the customer ID number to associate a particular transaction for a particular title with a particular customer. Each such transaction will have a unique identifier. This information is provided from the delivery device to the central storage facility over the secure communications network 20. It is to be appreciated that the transaction ID refers to the watermark and other specifics of the transaction, but that the context of the key is arbitrary and unrelated to any watermark data or customer information. The watermark key is therefore meaningless out of context.

The delivery device 18 can also include a robot device 92 that picks the burned media such as, for example, a DVD from a spindle in, for example, batches and sorts the burned media, packages the burned media with the printed sleeve art and seals within an appropriate case such as, for example, a jewel case, as known to those of skill in the art. Alternatively, it is to be appreciated that the delivery device need not include such a robotic device, and that packaging and delivery can be done, for example, by personnel at the delivery device or at the local retail partner housing the delivery device.

Watermarking Device

Figure 5:
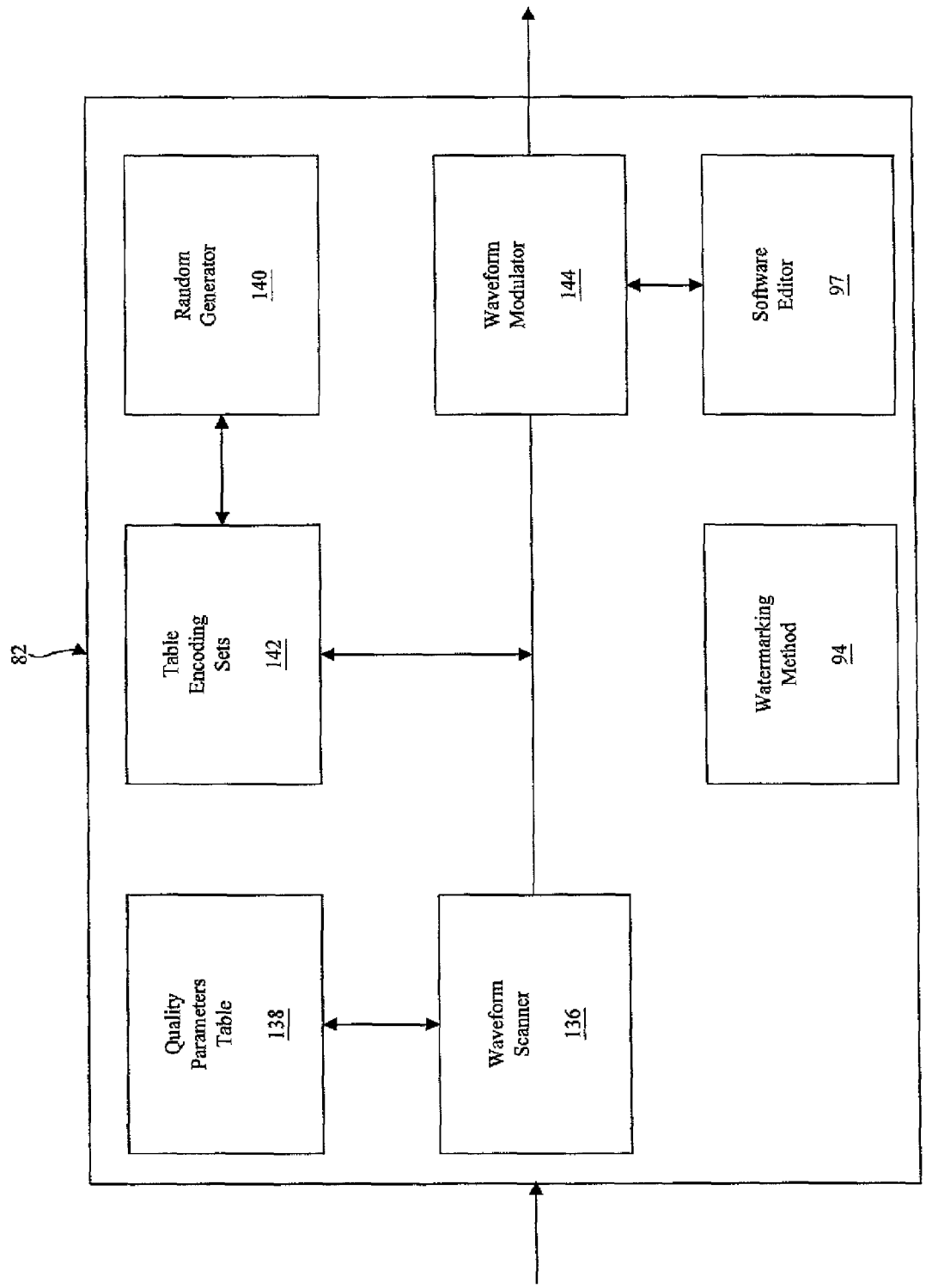
FIG. 5 illustrates an embodiment of a watermarking device according to the invention.

The system and method of the invention include a unique method and watermarking device 82 for providing anti-piracy protection, known to those in the art as electronic watermarking. Referring to FIG. 5, an embodiment of a watermarking method 94 to be discussed infra and the watermarking device 82 can be used to protect any of, for example, audio title data, video title data, and software title data by embedding information into the title data. As has been discussed above, the title data can be provided on a selected medium or can be broadcast, for example, over an on-demand service or network, or can be provided to the customer over the communications network 20 as, for example, an Internet download or streaming data. It is to be understood that with the watermarking device and method of the invention, the watermarking is to the data itself and therefore applies to any of the above mediums of delivery of the title data. It is also to be understood that this watermarking methodology and the watermarking device provide a form of anti-piracy protection that is to be distinguished from other forms of anti-copy protection known to those of skill in the art, and is intended to be a complement to such forms of anti-copy protection.

It is to be appreciated that the watermarking device 82 and the watermarking method 94 of this embodiment of the invention can also be used with existing delivery process chains in, for example, the software and movie industries, can be used with existing distribution and delivery chains, for software, music, and movie title data and can be used by content providers, industry organizations seeking improved anti-piracy solutions, or individual companies within the industry. It is also to be appreciated that the watermarking device and method of the invention is preferably used in the system 10 of the invention, and that the watermarking device and method of the invention allows title owners to register and track each purchased or rented title, since the watermarking cannot be defeated without great difficulty. In particular, a watermarked title according to the invention allows title owners to track each duplicate of an original title that is made.

The watermarking device 82 and method 94 of the invention can be used for motion picture titles, audio CDs, compressed music files such as in MP-3 format, computer software titles including, for example, business applications, computer games, operating systems, and the like. Preferably, the customer will be warned of the presence of the watermark on, for example, the burned medium and/or on the sleeve of a burned medium and/or by a warning in the actual purchased title data when viewed. This warning will create a clear deterrent to the consumer who knows that the consumer's own information travels with any subsequent and unauthorized copy made of the media or title data. For example, this information can be retrieved from any subsequent copy of the title data when processed through a decoding device 98 (see FIG. 8), to be discussed in detail infra, thereby allowing legal authorities and/or authorized users of the decoding device to trace the origin of the illegal copy back to the original purchaser, and to potentially prosecute the original purchaser and/or other parties for, for example, copyright infringement. Accordingly, it is to be appreciated that content providers receive a value-added anti-piracy protection, complementing both existing and developmental anti-piracy measures.

Referring to FIG. 5, it is to be appreciated that the watermarking device 82 and method 94 of the invention can be any of hardware, software, and a combination of both software and hardware. In particular, one embodiment of the watermarking method provided by the watermarking device will preferably be C++ code that resides within a Windows NT, Pentium III, 500 MHz or above platform. The watermarking device may include, for example, a direct X plug-in that can communicate with off-the-shelf high quality PC audio cards, that typically include a digital signal processor 96, through, for example, known and available audio software editors 97.

As has been discussed above, the watermarking device will preferably be located at the delivery device 18 (see FIG. 4) or resident, for example, at the head end in a store and forward type of on-demand delivery network (not illustrated). An input to the watermarking device will be the title data to be watermarked and the customer ID information which shall be provided as a secure network transfer over the communications network 20. However, it is to be appreciated that the input source could also be other variations known to one of skill in the art such as, for example, from an operator at a Windows-based user interface on, for example, the local queue and status manager device 74 of the delivery device 18, that allows the ID code of a user to be manually entered into the system.

According to a first embodiment 110 of the watermarking method 94 of the invention, the method of watermarking is used for any title data containing audio title data such as, for example, motion picture title data and audio title data. A second embodiment 146 of the method 94 of watermarking the title data is used for any title data that does not contain audio title data such as, for example, software title data and other digital data files. It is to be appreciated that each of these methods embeds customer identification information into the title data.

Watermarking Method

Figure 6:
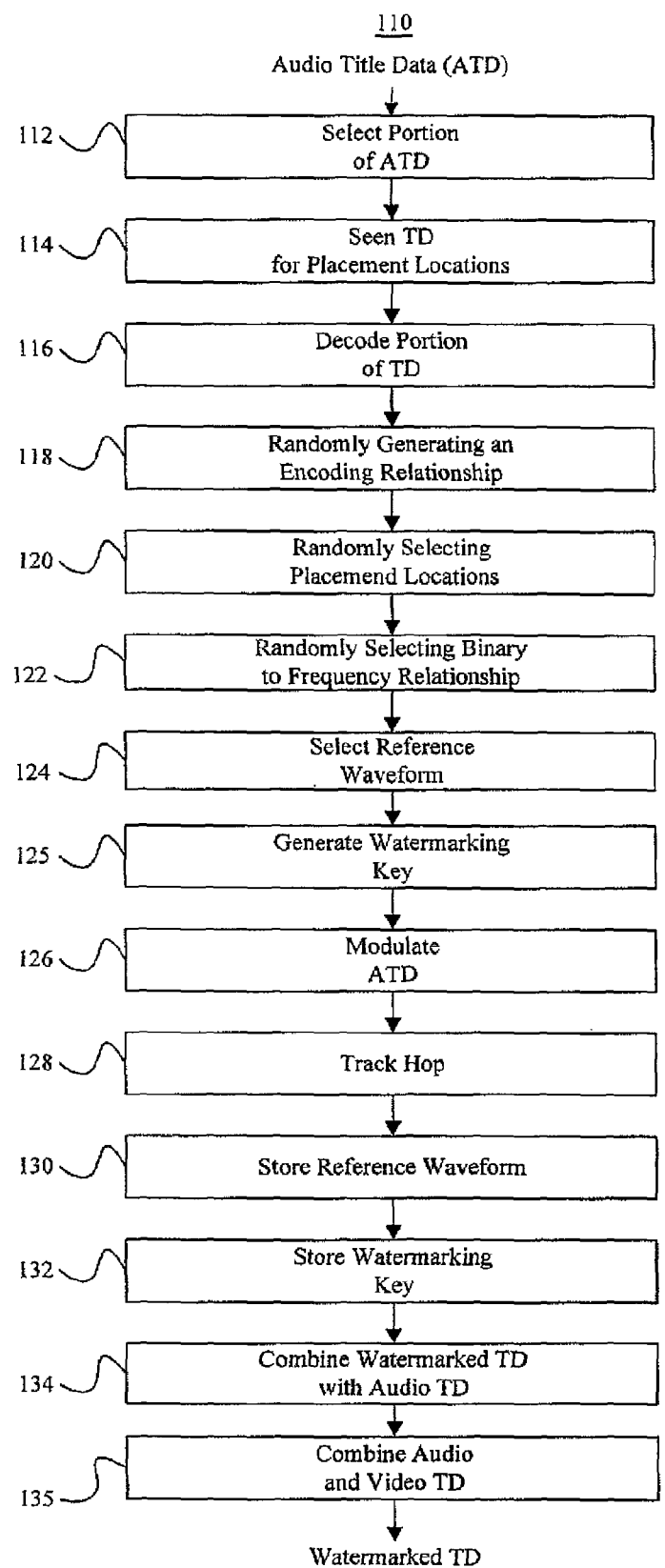
FIG. 6 illustrates an embodiment of a method of watermarking title data according to the invention.

Referring to FIG. 6, there is illustrated a first embodiment 110 of the method 94 for watermarking the audio title data. As has been discussed above, it may be preferable to watermark only a portion of the audio title data so that the entire audio title does not have to be watermarked. Accordingly, a step 112 may be selecting a portion of the audio title data to be watermarked. Before the customer ID information can be inserted into the portion of the title data as a watermark, the title data waveform is scanned Step 114 to determine available placement locations within the audio title data, by a waveform scanner 7 within the watermarking device (see FIG. 5). In particular, the watermarking device can include a quality parameters table 138 (see FIG. 5) including maximum limits on a frequency deviation that are allowed between, for example, channels of an audio title or within the audio title data file to be watermarked. It is to be appreciated that although the steps of selecting a portion of the audio title data and scanning the audio title waveform have been illustrated as occurring within the watermarking device 82, these steps can also be accomplished elsewhere in the system 10 of the invention. For example, the steps of selecting a portion of the audio title data and scanning that portion of the audio title data are preferably accomplished with a waveform scanner 7 and a quality parameters table 138 located within the service bureau 16 of the system, so that the portion of the audio title data need only be scanned at the time of capturing the title data and not each and every time that the audio title data is provided to the delivery device 18. In particular, in this embodiment of the system 10, the correlation table discussed above, which is also provided by the service bureau 16 to the central storage facility 12 for association and storage with the encrypted audio title data and the decryption key, can include a mapping of the plurality of locations in the audio title data where it can be watermarked. The correlation table will be provided by the central storage facility along with the encrypted audio title data and the decryption key to the delivery device 18.

As has been discussed above in connection with the delivery device 18, the delivery device includes a decoding device 80 that may be needed, for example, to decompress the audio file where the audio file is in, for example, an MPEG-2 format for a movie title. Accordingly, step 116 of the watermarking method includes decoding at least a portion of the audio title data. However, it is to be appreciated that the audio title data need not always be decoded, where, for example, the audio title data is in CD format. Once a plurality of placement locations for watermarking the audio title data have been determined in step 114, a next step 118 includes with a random generator 140 within the watermarking device 82, randomly selecting one of a plurality n encoding relationships, wherein each encoding relationship of the n encoding relationships includes information indicating where in the plurality of placement locations the watermark will be inserted (step 120), and also includes selecting a binary numerical relationship to a frequency of modulation (step 122) that will be applied to the audio title data at each of the selected placement locations. Accordingly, the watermarking device 82 (see FIG. 5) also includes a table 142 containing the plurality n of encoding relationships. It is to be appreciated that n can be any number, and is preferably a finite number. Thus the step 118 includes the step 120 of randomly selecting from the plurality of placement locations, the plurality of locations to watermark the audio title data and the step 122 of randomly selecting the binary number to frequency relationship from the plurality of binary number to frequency relationships.

It is to be appreciated that with the decoding device 98 and decoding method 100 of the invention, to be discussed infra, there are a plurality of reference waveforms that can be created and used to decode the watermarked audio title data into the customer ID number. For example, a first reference waveform can be an archived master title data file that is stored without alteration, for example, at the central storage facility 12, and which is to be compared with the watermarked copy of the audio title data or with one or more channels of the watermarked copy of the audio title data. Alternatively, for a soundtrack of audio title data that contains two or more individual channels such as, for example, a stereo music file, a common channel such as, for example, a left channel, can be selected as the reference waveform, whereby the left channel remains unaltered by the watermarking process and the right channel is frequency altered by the watermarking process. Accordingly, another step of this embodiment of the method of watermarking is a step of selecting the reference waveform which can be any of, for example, a master copy of the audio title data, or a channel of the audio title data. It is to be appreciated that although the step of selecting the reference waveform has been illustrated with respect to a stereo audio track, that variations to one of skill in the art are intended to be within the scope of the invention. For example, any audio title data with two or more tracks can be used, including a mono soundtrack, since a mono soundtrack has two channels of audio. It is to be appreciated that the reference channel or the master audio file is stored, for example, in the central storage facility and is used to decode the watermarked audio title data.

A next step 125 in this embodiment of the watermarking method 94 is generating a watermarking key that is also to be stored in the central storage facility. The watermarking key is a combination of the randomly selected binary number to modulation frequency relationship and the customer ID information. The watermarking key can then be used by the decoding device 98 and decoding method 100 to be described in detail infra, to decode the watermarked title data to determine the customer ID information. A next step 126 in this embodiment of the method of watermarking includes modulating with a waveform modulator 144, which is preferably the digital signal processor 96 in combination with the software editor 97 within the watermarking device 82, the audio title data waveform with a frequency modulation at the plurality of randomly selected placement locations and according to the randomly selected binary number to modulation frequency relationship, to encode the customer ID data into the audio title data to provide a watermarked audio title. In particular, the audio title is watermarked with the customer information data provided by the system, wherein the randomly selected binary number frequency relationship is used to modulate the audio title data to insert the customer information data into the audio title data at the randomly selected placement locations. It is to be appreciated that with this embodiment of the watermarking method and watermarking device 82 (see FIG. 5), no two watermarked audio title data files will contain the same customer ID, and thus each watermarked copy of an audio title data file will be unique and can be individually traced back to a customer.

Another step in this embodiment 110 of the watermarking method 94 includes track-hopping, wherein the watermarking device 82 randomly changes between the reference channel and the watermarked channel of the audio title data file. It is to be appreciated that the track-hopping step can be used with this embodiment where one of the audio channels is selected as the reference waveform and another channel of the audio title data is to be watermarked. An advantage of including the track-hopping step in this embodiment of the method and device, is that it makes it even harder to defeat the watermarking since a user cannot simply remove one track of the audio title data from the audio title and eliminate the watermarking. A next step 1 in this embodiment of the watermarking method includes storing the reference waveform or master title data in the central storage facility, and also storing 132 the watermarking key of the central storage facility. In addition, as has been discussed above, for the instance where only a portion of the audio title data has been watermarked, another step 134 in this embodiment of the watermarking method includes combining the portion of the watermarked audio title data with the remainder of the audio title data to provide the watermarked audio title data. Further, where the audio title data is to be combined with video title data such as, for example, for a movie title, another step 135 includes combining the watermarked audio title data with the video title data to provide a composite watermarked selected title data.

It is to be appreciated that an advantage of this embodiment of the method 110 of watermarking is that it remains intact through numerous media transformations such as, for example, signal compression, broadcast and Internet transmissions, digital-to-analog conversion, radio, television, cable or satellite broadcasts, and the like. It is also to be appreciated that this embodiment 110 of the method of watermarking can be used with conventional two-channel audio, or with any number of matrix audio and/or digital surround sound encoded audio tracks. It is further to be appreciated that the quality parameters table 138 within the watermarking device 82, is provided with frequency deviation limits that ensure that the frequency modulation will not be discernible to the human ear. In addition, it is to be appreciated that with this embodiment of the method of watermarking, particularly where only a portion of the audio title data is selected to be watermarked, there is little likelihood that the audio title data will be distorted enough to hear or distorted enough to cause the video and the audio in, for example, a movie title, to become desynchronized over the length of the movie title. It is further to be appreciated that an advantage of this embodiment of the method 110 of watermarking is that it is very hard to defeat, and it would take a very extensive effort to do so.

Figure 7:
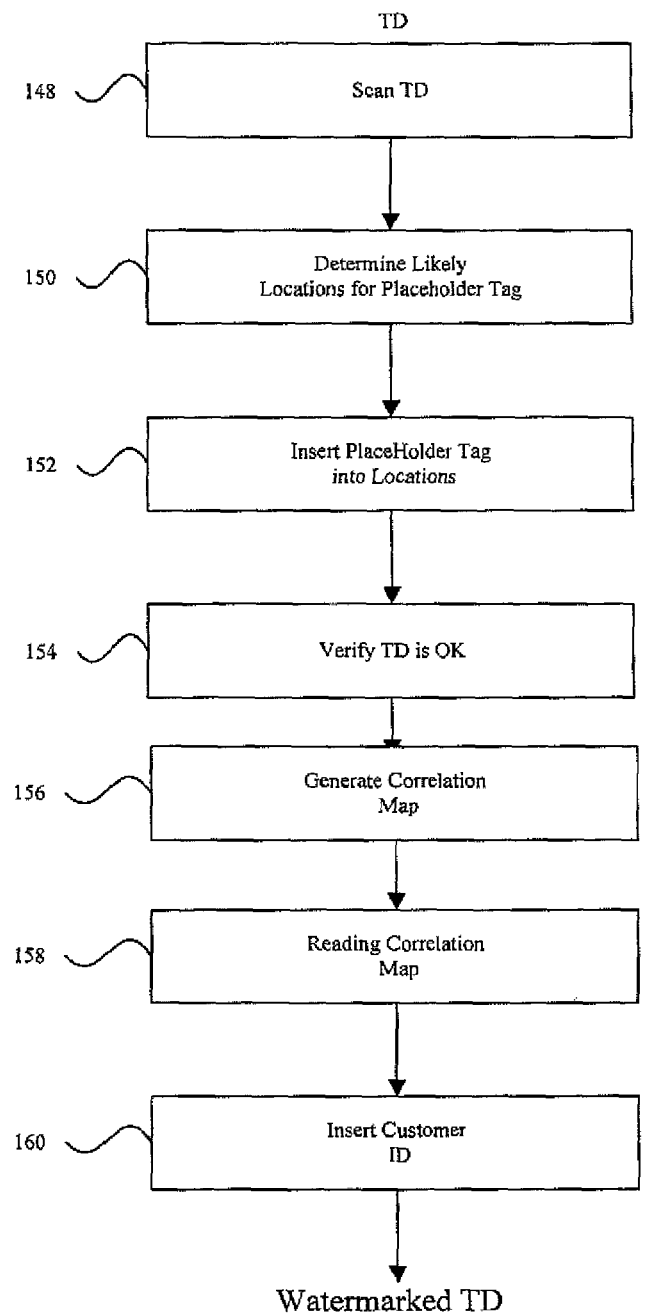
FIG. 7 illustrates an alternate embodiment of a method of watermarking title data according to the invention.

Referring now to FIG. 7, there is illustrated a second embodiment 146 of the method 94 of watermarking, according to the invention. This embodiment can be used for non-audio title data such as, for example, software title data. After the title data has been acquired from a content provider, a first step 148 includes scanning the title data to determine where in the title data information can be put into the title. This step 148 includes a step 150, which is a likely location determination of likely spots where an identifying tag can be injected harmlessly into the title data. For example, the likely spots include unused space in any and all file headers, a simulated minor disk or file corruption, encoded or clear text inserted as text comments into specific file types such as, for example, .html, .pdf, .txt, and the like. A next step 152 of this embodiment includes inserting a placeholder tag into the locations that have been determined. A next step 154 of this embodiment includes verifying that the title data is still installable and certifying that the title is ready to be provided to a consumer. A next step 156 of this embodiment 146 of the method 94 of watermarking includes generating a correlation map of the locations where the placeholder tag has been inserted into the title data.

It is to be appreciated that each of steps 148, 150, 152, 154 and 156 while illustrated as part of this overall second embodiment of the method of watermarking, can be done at various locations within the system of the invention. For example, in one embodiment of the system 10 and method of the invention, these steps are done at the service bureau 16 prior to encrypting the title data and forwarding the title data to the central storage facility 12. An advantage of performing these steps at the service bureau as opposed to, for example, at the delivery device 18 is that these steps need only be done once for each title. In contrast, if these steps are performed at the delivery device, then these steps will be performed for each copy of the title data that is to be provided by the method and system of the invention.

Where the above steps 148-156 are performed at the service bureau, the correlation map will be provided to the central storage facility 12 along with the encrypted title and the decryption key. In addition, after the title has been ordered and verification of the credit card information and generation of the customer ID has occurred, the purchase of the title begins with an order through the entry portal 14, and the encrypted title, the correlation map and the decryption key are provided to the delivery device. The title is then decrypted using the decryption key as discussed above.

A next step 158 in this embodiment 146 of the method of watermarking includes with the watermarking device 82, reading the correlation map to determine the locations where to insert the customer ID, and inserting (step 160) the customer ID into the title data at each of the placeholder tag locations. After the customer ID has been inserted into each of the placeholder locations, the title data has now been watermarked and the watermarked title data is handled by the delivery device as discussed above.

Decoding Device

Figure 8:
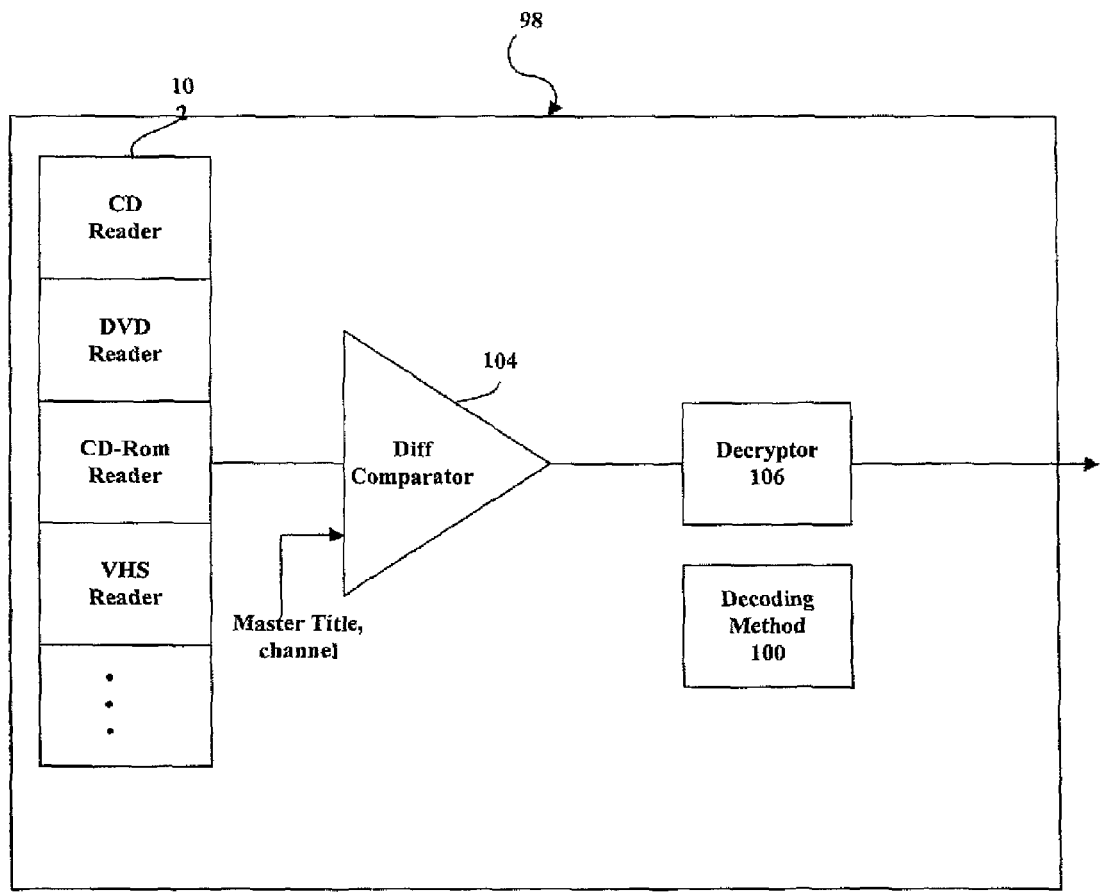
FIG. 8 illustrates a decoding device that can be used to decode watermarked title data according to the invention.

Referring to FIG. 8, there is illustrated a decoding device 98 including a decoding method 100, that can be used to decode the watermarked title data to determine the customer ID. The decoding device 98 can be used, for example, where a copy of a title is suspected as having been copied from an originally purchased copy by, for example, law enforcement officials or by an operator of the decoding device and method of the invention, who is authorized to do so. The decoding device 98 can include, for example, a PC having a Pentium III processor, 500 MHz or higher, running a Windows NT environment, along with a plurality of playback or reader devices 102 that may be needed in order to read a digital or analog copy that may have been copied from an originally purchased medium or title data, where such media copies are suspected of containing watermarked data provided by the watermarking method and device 84 of the invention. The plurality of reading devices 102 can include, for example, a CD reader, a DVD reader, a VHS reader, a CD-ROM reader, as well as any other reading device that may be used to read a medium suspected of having been copied from an originally purchased title.

Decoding Method

Figure 9:
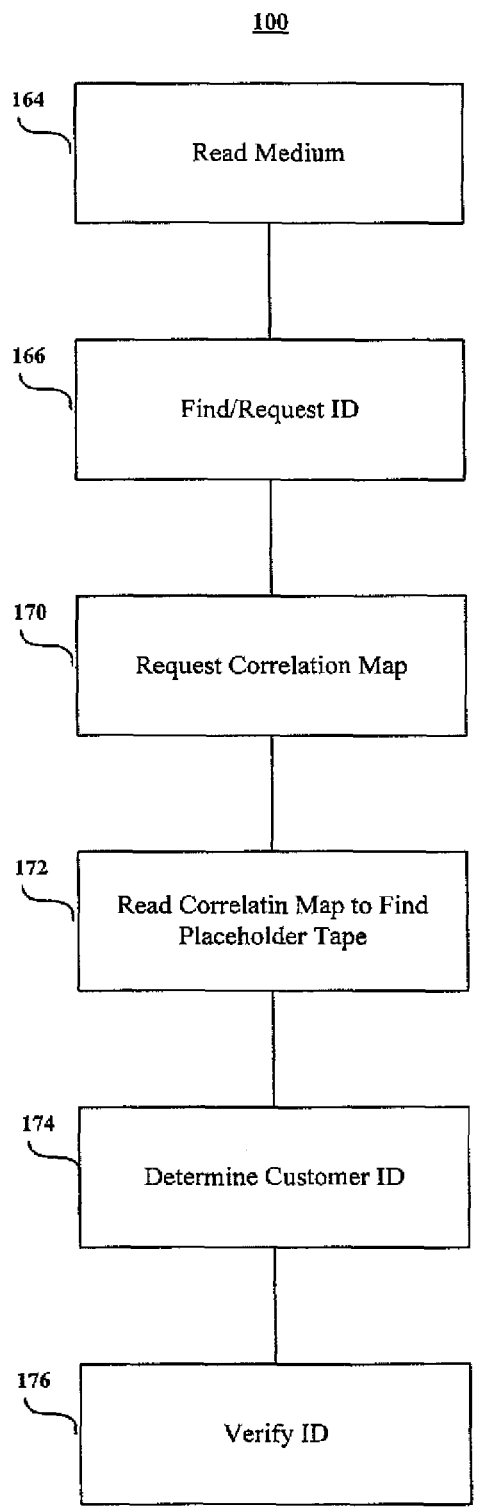
FIG. 9 illustrates an embodiment of a method of the decoding watermarked title data according to the invention.

Referring to FIG. 9, in a step 164 of an embodiment of the decoding method 100 of the invention, the reading device reads the suspected medium. In another step 166, the decoding device may find a name or other identifying indicia from the copied medium, or alternatively, requests an operator to provide a name or other identifying indicia. In a next step 170, the decoding device requests that the correlation map be provided. For example, in one embodiment of the system 10, the decoding device is coupled to the communications network 20, and requests the correlation map from the central storage facility 12. In response the correlation map is sent to the decoding device. In a next step 172, the correlation map is read to determine the plurality of placeholder tag locations, and in a next step 174, the watermarked title data is read at each of the plurality of placeholder locations to pull the customer ID from the plurality of placeholder locations. The decoding device then verifies (step 176) the identity of the customer based on the customer ID with the central database with an authenticated transaction over the communications network.

Figure 10:
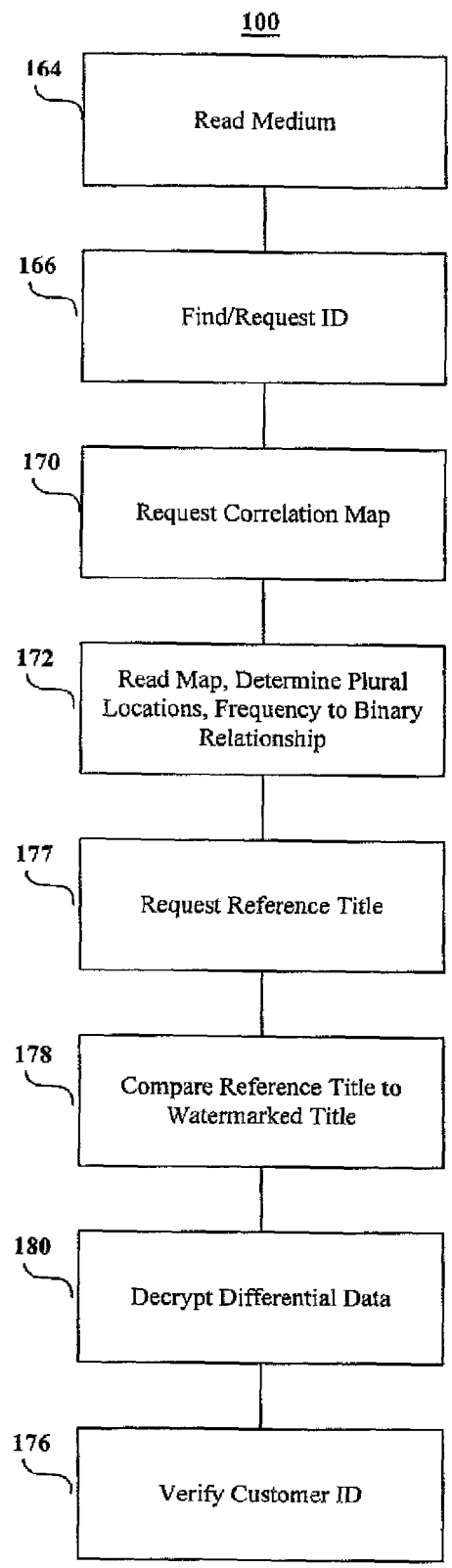
FIG. 10 illustrates an alternate embodiment of a method of decoding watermarked title data according to the invention.

Referring to FIG. 10, there is illustrated an alternate embodiment of decoding the method 100 of the watermarked title data. Common steps to the method 100 illustrated in FIG. 9 are illustrated with like reference numbers. In particular, the decoding device 98 reads the copied medium 164, finds the identifying indicia (step 166), requests the watermarking key and correlation map from the central storage facility 12 (step 170), and reads the watermarking key and correlation map to determine the frequency to binary number relationship and where the title data has been watermarked (step 172). The decoding device also requests (step 177) a copy of the reference title data from the central storage facility. The decoding device 98 (see FIG. 8) includes a differential comparator 104 that compares (step 178) the watermarked title data with the reference title data or with a reference track or channel of the reference audio title data, to provide differential data between the watermarked title and the master title data. The differential data is then decrypted (step 180) with decryptor 106 of the decoding device to determine a data set which will unlock the customer's ID code. In particular, the decryption device determines the customer ID from the frequency to binary number relationship and the randomly selected placement locations.

Entry Portal

Figure 11:
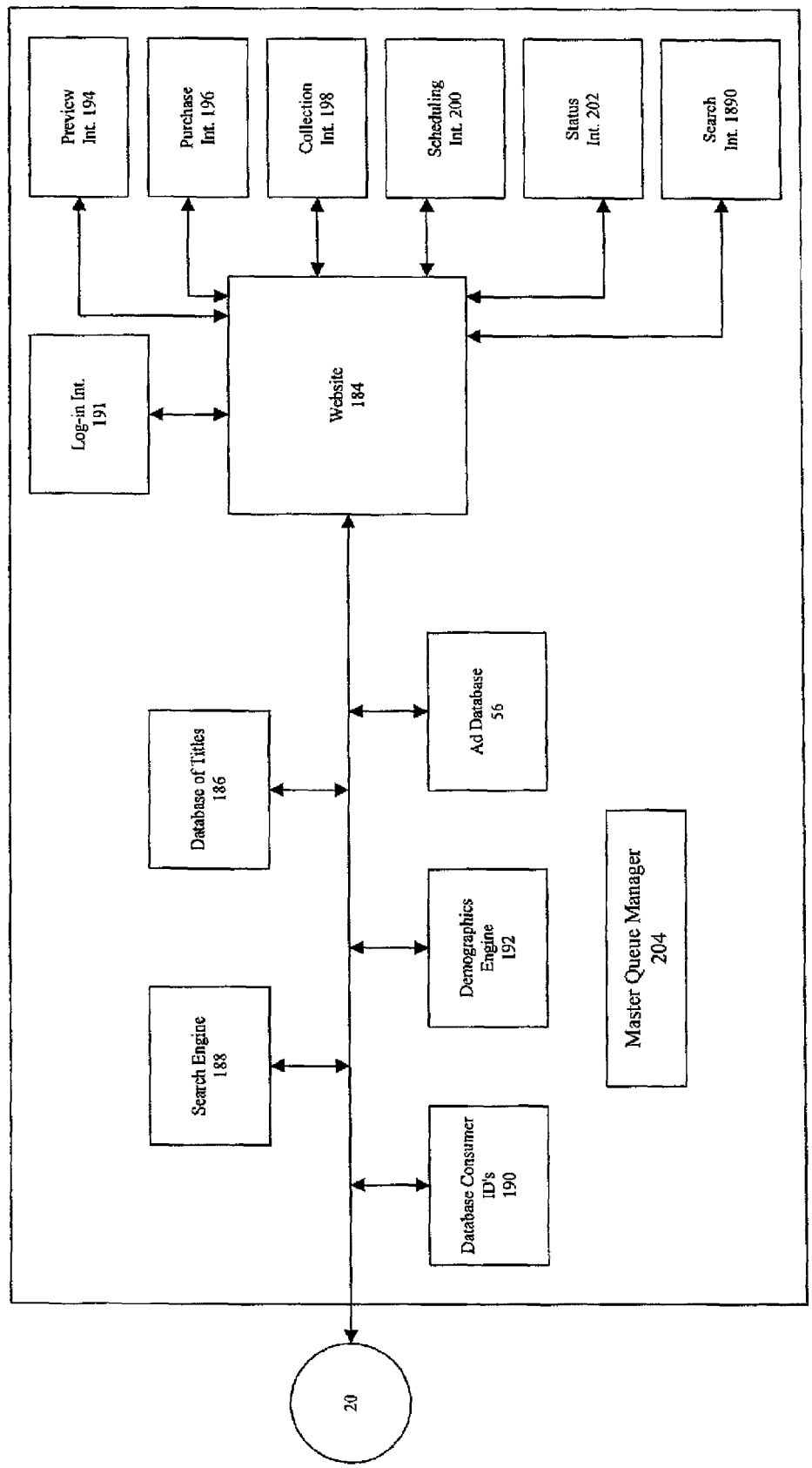
FIG. 11 illustrates a functional block diagram of an embodiment of an entry portal of the system of FIG. 1.

FIG. 11 illustrates a functional block diagram of an embodiment of the entry portal 14 of the invention. It is to be appreciated that FIG. 11 illustrates a functional block diagram, wherein devices illustrated are not necessarily located within the entry portal, but instead may be accessible with the entry portal over, for example, the communications network 20. In a preferred embodiment, the entry portal is coupled to the communications network 20, and accesses a web site 184 that is accessible with any Internet browser. The web site allows review of the title database 186 that is preferably the title database 54 at the central storage facility 12, and has access to search engine 188 that allows a consumer to search for a particular title via any of a plurality of criteria. For example, the web site may offer any of music, video, and software titles, for preview, rental, and sell through, wherein the user can search for the title using the search engine 188. The title database 186 includes textual information for each title data file available with the system 10, whether the title data is located at a local delivery device 18 or whether located at the central storage facility 12. The title database is updated periodically to reflect additions to the title database, to ensure that the web site has access to all available title data files. It is to be appreciated that although this embodiment of the entry portal is illustrated with access to a web site, various alterations or modifications to one of skill in the art are intended to be within the scope of the method and system of the invention. For example, the entry portal can be accessible through an Internet browser via a PC co-located with a delivery device 18 at a local retail outlet. Alternatively, the entry portal can be, for example, a dedicated kiosk that performs the same functions and has the same components, but the web presence is constantly running on the kiosk, and it is co-located with a delivery device at a local retail outlet.

It is to be appreciated that the entry portal 14 can display the title data within categories, as thumbnails, based on new release dates, or even based on a personal preference of a particular consumer derived from demographics data or prior history data provided by the consumer. For example, the search engine 188 can search the title database 186 and present suggested movies to a consumer based upon this user's prior purchase history or selection history. The entry portal may provide a search interface 189 including search criteria to assist a consumer in locating a title. For example, the search engine 188 in combination with the search interface may allow free form requests such as, "every movie that Elvis was in", and also may be capable of taking more subjective criteria, such as, "funny war movies." The search engine may also suggest other titles similar to the ones that have been selected.

The entry portal 14 may also have access to a database 190 of consumer IDs and an associated login interface 191 to a login procedure. To access the entry portal, the consumers can identify themselves through the consumer identification process at the login interface 191, whereby such identification may include providing a unique identification code through the web site 184. For example, the consumer may be prompted to either enter a new customer information screen or enter his or her existing PIN number to log in to the web site 184. When a new user gains access to the web site, the login procedure may request certain demographics information from the consumer such as, for example, shipping information, preferences for titles, credit card information, address information, the consumer's name, and the like, to create a user profile associated with the user ID, that can be stored, for example, in the central storage facility 12. In addition, the entry portal may have access to a demographics engine 192 that based on the consumer's demographic data, can select advertisement data from the advertisement database 56 (see FIG. 2) to be provided to the consumer at the entry portal or inserted into the title as discussed above. In addition, the database of consumer profiles can keep a history of previous titles purchased by the consumer and, from this information, the demographics engine can determine whether to present an ad for a particular title to the consumer based upon the consumer's prior purchases.

For example, the database of consumer IDs and profiles 190 allows the demographic engine 192 to target specific advertising and promotional messages to be sent to the customer. As discussed above, the consumer information stored in the database 190 can include, for example, but not be limited to a name, address, gender, age, entertainment, personal preferences, and the like. Once this information is provided through the login interface, consumer profile data can be sent over the secure communications network 20 to the central storage facility 12 to be kept in the consumer database 190. Once the unique consumer profile has been stored, it is used in conjunction with the advertising content data and the demographics engine to direct unique messages to the consumer, based on the compiled information contained in the consumer database. Such messages can be sent, for example, from the central storage facility 12 to the entry portal 14 or from the local cache 68 in the delivery device 18, to the entry portal 14. These messages can also include, for example, public service announcements, targeted advertisements and promotions, notifications of special events, and/or facts, and the like. Information from the consumer database can also be used, for example, to notify the customer based on prior history information, of a current title data file currently available that may interest the consumer, or that the consumer has previously purchased a selected title, or that a given artist has recently released a new title which the consumer has previously purchased a number of titles from. With a dynamic process, the customer profile may be continually updated based on customer activities via the entry portal 14, and this updated customer data may result in new and unique messages be provided to the customer over time.

The entry portal 14 may also have access to a preview interface 194 that is, for example, scalable to any size and that displays high quality previews, for example, of thirty to sixty seconds in length of a movie trailer selected by the consumer for potential purchase or rental. It is to be appreciated that the preview interface can be a custom interface or any existing interface known to those of skill in the art such as Real Player from RealNetworks.com.

The entry portal 14 may also have access to a purchase interface 196 that allows a consumer to provide information to effect a credit card transaction over the secure communications network 20. In addition, the purchase interface can suggest different locations for a user to pick up a title at various local retail outlets based on the user's demographics. The entry portal may also have access to a collection interface 198 that, for example, allows the consumer to build a collection of, for example, audio titles for a CD from multiple audio titles, and may allow the consumer to specify an order in which to create the medium containing the collection of audio titles. In addition, the collection interface can allow the user to create custom text and custom graphics to be printed, for example, on a CD, or any other medium.

The entry portal 14 may also have access to a scheduling interface 200 that provides a consumer with the ability to schedule, for example, a periodic ordering of titles, a periodic creation of media, and/or automatic billing and delivery of media containing selected titles. For example, the scheduling interface can allow a consumer to compile a collection of all news shows for a given week, or all the archived scheduled broadcasts of sessions of Congress. The scheduling interface can also allow the consumer to specify where the consumer wants to have the product made or delivered or picked up. Further, the scheduling interface can allow the consumer to have the product made any time from, for example, from one hour to anytime later. For example, the consumer may wish the schedule to have a medium burned and ready for the consumer to be delivered Tuesday of the following week in New York City, because the consumer plans to be on a business trip and wishes to have the medium waiting at his or her hotel upon arrival. In addition, the scheduling interface can allow a consumer to schedule repeating purchases such as, for example, to buy all new releases from Paramount and have them delivered as they are released, and to arrange to be billed for the titles at the time of their delivery. Another example is that a consumer may wish to schedule for weekly selections to be created and delivered to the consumer, or available for pick up at a time and place specified.

The entry portal 14 preferably also has access to a status interface 202. As has been discussed infra, once a consumer decides to make a purchase, a secure credit card transaction occurs, and the process of delivering the title to the consumer or burning the title for pick up by the consumer begins. As has been discussed above, this transaction creates a unique consumer ID that is provided, for example, by the entry portal to the delivery device 18 to begin the process. The consumer may wish to be able to track the status of his order, and the status interface can allow the tracking of the status of the job including when the title has been delivered to the delivery device, and if the title is to be burned on a medium, when the burning of the medium begins, and when the burning of the medium is completed. In addition, the status interface may display a time commitment to the consumer such as, for example, that the medium will be shipped by xx:xx and arrive to the consumer by yy:yy tomorrow or that the medium will be ready to be picked up by zz:zz by the consumer at a suggested or selected local retail outlet. It is to be appreciated that the status interface can be, for example, a visual display window within the web site or any other variation or modification known to one of skill in the art.

The entry portal 14 can also have access to a master queue manager 204 that, for example, communicates with the local queue and status manager 74 at the delivery device 18 and that communicates with the status manager device 62 at the central storage facility. The master queue manager, for example, can manage an order in which the system and, in particular, the delivery device burns and prints the decrypted selected title data to a selected medium, and interacts with the delivery device to provide the status interface 202 including the status indicator. In particular, the master queue manager may allow a user of the entry portal 14 with appropriate privileges to control the status of any order submitted to the method and system 10 of the invention. For example, an employee with specified privileges can modify an order of a title that is to be provided by the delivery device. The master queue manager can, for example, be used by employees of a local retail outlet. The entry portal, and in particular the web site 184 can have access to other devices typical of retail web sites such as, for example, a shopping cart for holding a customer's selections until purchase, accounting hooks that are part of the purchase interface 196 for allowing a secure credit card transaction to occur via the web site, and the like. The accounting hooks may, for example, collect the customer's credit card information and communicate it over the secure communications network 20 and receive back via a secure communication an approved order number, and as a result, generate the customer ID number that is the basis of beginning the process of delivering a title to the consumer.

Method Overview

Figure 12:
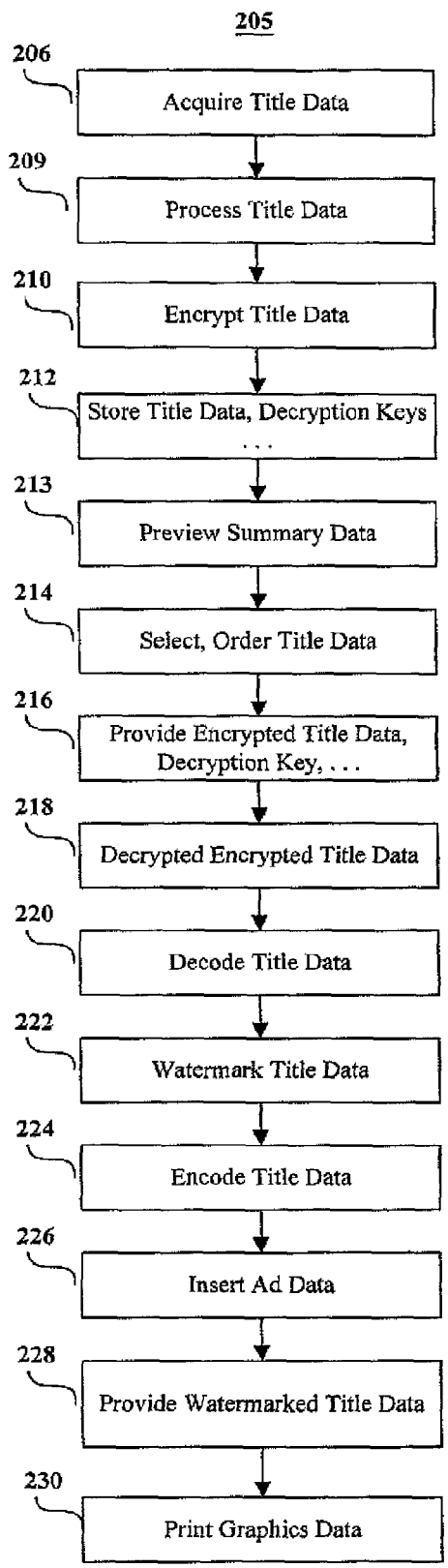
FIG. 12 illustrates an embodiment of a method of providing the title data according to the invention.

Referring to FIG. 12, there is illustrated an embodiment of an overall method 205 of the invention. A first step 206 includes acquiring title data from a content provider. As discussed above, the title data can be music title data, video title data, software title data, graphics data, preview data, and the like. The step of capturing the title data can include capturing advertisement content data and graphics data. In addition, the step of capturing the title data can include periodically receiving updated title data from, for example, a subscriber network. Another step 209 includes processing the title data. The step of processing can include, for example, encoding the title data, reformatting the title data, converting the title data from analog title data to digital title data, compressing the title data, and the like, as has been discussed herein with respect to the service bureau 16.

Another step 210 includes encrypting the title data to provide encrypted title data and a corresponding decryption key for each title. The step of encryption can include, for example, determining locations in the title data to insert placeholder tags, and inserting the placeholder tags into the title data. The step of encrypting can also include scanning the title data to determine a plurality of possible placement locations for inserting watermarked data into the title data, and can also include segmenting the title data into a plurality of chunks of data, and providing an decryption key for each chunk. The step of encrypting can also include dividing movie title data into audio title data and video title data and providing an decryption key for each, all of which have been described herein.

Another step 212 includes cataloging and storing the encrypted title data and its corresponding decryption key. This step of storing the encrypted title data can also include storing and cataloging the preview data; storing and cataloging a relationship between each of the encrypted title data, the decryption key, and the preview data; storing a correlation map of locations in the title data where the placeholder tag has been inserted into the title data; and storing a correlation map between the chunks of the title data and the correlation map's relationship to the title data. In addition, this step of storing and cataloging can include storing and cataloging a plurality of advertising data, graphics data, and the like. This step of storing and cataloging can also include storing a serial number along with the encrypted title data and updating the content provider's serial number to reflect a customer ID number upon purchase of the title data. The step of storing can further include storing a watermarking key including customer ID data, the relationship between the watermarked title data and binary numbers, as well as information indicating the plurality of locations where title data has been watermarked, all of which have been herein described.

Another step 213 is a customer previewing summary data of the plurality of title data. This step can include transferring preview data from the central storage facility 12 to the entry portal 14 in response to selection information provided to the central storage facility by, for example, the delivery device 18, so that the preview can be viewed by a consumer, as well as summary descriptions, thumbnails, and the like. The step can also include transmitting advertising data from the central storage facility to the entry portal to be viewed by the consumer. It is to be appreciated that this step can be accomplished, for example, through an e-commerce web site 184, all of which have been herein described.

Another step 214 of the method includes selecting and ordering selected title data. This step can include providing selection information data and customer information data to the communications network 20 via the entry portal 14. The step can also include obtaining approval for the order over a secure communications network, and as a result of the approval, providing customer information data and selection information data to the delivery device 18. This step can also be accomplished, for example, through the e-commerce web site 184. This step can further include sending the title selection information to the delivery device, all of which have been herein described.

Another step 216 includes providing the encrypted title data to the delivery device 18. This step can be in response to receipt of a request for the encrypted title data and the decryption key from the delivery device. This step can include providing the corresponding decryption key to the delivery device. This step can also include transmitting the correlation map from the central storage facility 12 to the delivery device. The step can also include transmitting advertising content data, graphics data, and the like to the delivery device. In addition, this step of transmitting the advertising content data can be based upon, for example, demographics information of the customer ordering the title data, and/or a prior history of the customer. The step can also include transmitting encrypted video title data, encrypted audio title data, and a corresponding decryption key for each of the encrypted video title data and the encrypted audio title. This step can also include transmitting a plurality of chunks of the title data, a corresponding decryption key for each chunk, and the correlation map relating the plurality of chunks of title data. This step can also include checking a local cache 68 at the delivery device for the encrypted title data, and requesting the encrypted title data from the central storage facility only if the encrypted title data is not in the local cache, all of which have been herein described.

Another step 218 of the method is decrypting the encrypted title data with the corresponding decryption key to provide decrypted selected title data. This step can include decrypting encrypted video title data and encrypted audio title data with the corresponding decryption key for each of the encrypted video title data and the encrypted audio title data, to provide both decrypted selected video title data and decrypted selected audio title data. Alternatively, this step can include decrypting encrypted audio title data with the decryption key to provide decrypted selected audio title data. This step can further include decrypting chunks of the title data with the corresponding decryption keys and piecing back the title data according to the correlation map, all of which have been herein described.

Another step 220 of the process can include decoding the decrypted title data. This step can include decoding a portion of the decrypted audio title data or the entire audio title data. This step can also include decompressing the audio title data, all of which have been herein described.

Another step 222 of the method is watermarking the decrypted title data. The step of watermarking can be accomplished, for example, by either of the above described embodiments 110, 146 of the method 94 of watermarking the decrypted title data. The step of watermarking can include, for example, watermarking a portion of the decrypted selected audio title data to provide a watermarked portion of the decrypted selected audio title data. The step can also include combining the watermarked portion of the decrypted selected audio title data with the decrypted selected audio title data, to provide the watermarked decrypted selected audio title data. The step of watermarking can also include combining the watermarked decrypted selected audio title data with decrypted selected video title data, to provide decrypted selected title data, all of which have been herein described.

Another step 224 of this embodiment of the method may include encoding the watermarked title data. For example, where the decrypted title data has been decoded, such as audio title data that has been decompressed, after the audio title data has been watermarked, it is again encoded and, for example, combined with the remainder of the audio title data to provide encoded and watermarked audio title data, all of which have been herein described.

Another step 226 of this embodiment of the method of the invention, is inserting advertisement data into the watermarked decrypted selected title data. This step can include, for example, selecting the advertising content data from a local cache 68 at the delivery device 18 or receiving the advertising content data from the central storage facility 12. In addition, this step can include inserting the advertising content data into the decrypted selected title data. This step can also include printing the advertisement data on packaging or an insert to the medium on which the watermarked decrypted selected title data is to be burned. This step can also include selecting the ad data based on any of a plurality of criteria, all of which have been herein described.

Another step 228 of this embodiment of the method of the invention, is providing the watermarked decrypted selected title data to the consumer. This step can include, for example, providing the watermarked decrypted selected title data to the consumer over an on-demand network, to the consumer over the communications network 20 to be enjoyed at the entry portal 14 or to be burned to a medium by a burner co-located within the entry portal, or to be burned by a burning device 90 located within the delivery device 18. This step can also include burning a selected medium with the watermarked decrypted selected title data, all of which have been herein described.

Another step 230 of this embodiment of the method of the invention, can be printing the medium containing the watermarked decrypted selected title data and/or the packaging for the medium. This step can include, for example, printing the medium with graphics provided by the content provider, with custom graphics selected by the consumer, with customer identification information, with a local retailer's information, and the like. In addition, this step can include printing the packaging with any of the above information and/or a bar code, all of which have been herein described.

It is to be appreciated that the method 205 and system 10 of the invention are readily adaptable to an on-demand architecture such as a video on-demand architecture. For example, in addition to the delivery devices described with respect to the system of FIG. 1, separate local or regional delivery devices could be established for providing real-time, on-demand title feeds to homes, businesses, offices, libraries, and the like. For example, movies requested from the home, business or school library could be provided by the local delivery device to, for example, the home via a fiber optic connection, a standard cable connection, or other media depending upon the bandwidth needed for real-time viewing of the movie title. Alternatively, the title data can be provided from the delivery device to a cable head end to provide on-demand service to subscribers, wherein the movie title would be played over a dedicated channel at the subscriber's location and would be delivered to the subscriber by, for example, a fiber optic cable or a standard CATV cable. It is also to be appreciated that a regional telephone company could also have the equivalent of a delivery device within its infrastructure, for the delivery of a title on demand to a subscriber location.

It is to be appreciated that the method 205 and system 10 of the invention provide a consumer with predictability, and a complete selection and convenience in the purchase of any of, for example, software, movie and music titles. In addition, it is to be appreciated that the method and system of the invention provide a reengineered architecture with which to deliver the titles. It is further to be appreciated that the system and method of the invention incorporates unique, high-security features that, for example, make it possible to provide both high security copyright protection, in conjunction with on-demand consumer access to title data.

One advantage of the method 205 and system 10 of the invention is cost savings that result from decreased operating costs, that can result in increased operating margin, since a local retail outlet need no longer contain high inventory counts, have high warehousing rates, and high costs related to inventory, product obsolescence, and the like. Accordingly, an advantage of the system and method of the invention is that it provides decreased expenses and higher profit margins to retailers of the title data.

In addition, another advantage of the method 205 and system 10 of the invention is that it provides a faster, more efficient architecture to purchase or rent any of movie, software, and audio titles. It is to be appreciated that the system and method of the invention can be used, for example, in existing distribution and delivery chains for both software and movie industries, effectively creating a new architecture that has the advantages of the invention.

In addition, it is to be appreciated that the watermarking methodology 94 of the invention can be used by any of, for example, content providers, industry organizations seeking improved anti-piracy solutions, or individual companies within affected industries. In addition, it is to be appreciated that the watermarking technology of the invention complements existing anti-piracy technology. Accordingly, significant value is achieved with the system 10 and method 205 of the invention, including increased customer choice and product access speeds, increased security of the title content material, reduced overhead costs, and mitigated risks in merchandising the titles. Accordingly, consumers will have the benefit of increased selection and delivery times, retailers will see decreases in operating costs, and content providers will see increased security in distribution of their product.

It is to be appreciated that security is a hallmark of the method 205 and system 10 of the invention. In particular, the method and system include an encryption/decryption device and methodology, wherein the title data is not decrypted until a customer has provided a credit card number which has been approved to generate a valid transaction and customer ID information. In addition, a decrypted title is never retained by the system and the decryption key is never retained by the system. Moreover, the decrypted title data provided by the system and method of the invention is watermarked as a deterrent to piracy of the title data, and is intended to work in conjunction with anti-piracy protection measures to provide increased security to the title providers. In addition, movie title data can be separated into both audio and video title data, the title data can also be divided into chunks of the title data, which are not combined until the title is to be decrypted and provided to the consumer, and therefore provides an added measure of security. Further, the communications network is a secure network that requires authenticated transactions between each of the elements of the overall system.

It is also to be appreciated that with the system 10 and method 205 of the invention, it is the goal to provide MPEG-2 quality movie title data to the consumer in less than an hour. For example, with a fiber optic line as the primary communication mechanism between, for example, the central storage facility 12 and the delivery device 18, it is envisioned that at a speed of 50 to 75 Mbits/second, a full-length movie title can be pushed down the fiber optic line in ten minutes. Add to that five to ten minutes to burn the title which can be reduced, for example, with a 12× burner and some additional time to print the media, pick it and pack it into its appropriate packaging, and it is envisioned that the goal of providing the decrypted selected title within an hour is achievable.

Conclusion

Although specific embodiments have been illustrated and described herein, it will be appreciated by those of skill in the art that the above embodiments are provided only for the purpose of explaining the Applicant's claimed invention, and it will be appreciated that the Applicant's invention is not limited to what has been particularly shown and described herein above. There are many other applications for which the system and methodology of the embodiments of the invention described are not herein described, but which would be obvious to those of skill in the art in view of the herein described system and methodology. For example, the system could be used to pre-manufacture duplications of the titles at the delivery devices. In addition, each of the above described elements could be implemented in a number of ways that would be obvious to one of skill in the art. For example, the accounting hooks and system could be located at any of the central storage facility, the delivery device, or at the entry portal. Another example is that the central storage facility can be organized in a number of different ways that would be obvious to one of skill in the art. For example, different configurations of data storage equipment could be provided at both the central storage facility and at each of the plurality of delivery devices, in order to implement the central storage facility and the local cache herein described. In addition, each of the encryption, decryption, encoding, decoding and data manipulation devices herein described can be performed with software, hardware and/or a combination of hardware and software. Accordingly, it is to be appreciated that such modifications are intended to be within the spirit and scope of the invention, and that Applicant's invention is limited only by the claims and the equivalents thereof, which are appended hereto.

The invention claimed is:

1. A device, comprising:
   a computer-readable medium configured to store watermarked title data, the title data being watermarked with a code; and
   circuitry, configured to extract the code from the watermarked title data on the computer-readable medium, by
      receiving watermarking information associated with the watermarked title data, the watermarking information identifying a plurality of placement locations and a number to frequency modulation relationship at each of the plurality of placement locations;
      demodulating the watermarked title data at each of the plurality of placement locations based on the number to frequency modulation relationship; and
      generating the code from the demodulated watermarked title data.

2. The device of claim 1, wherein the watermarking information comprises a correlation map and a watermarking key.

3. The device of claim 1, wherein the computer-readable medium comprises a CD or DVD, and the device further comprises a reading device.

4. The device of claim 1, wherein the code comprises a customer identification code, and the circuitry is further configured to verify that the user of the watermarked title data is a customer authorized to use title data.

5. The device of claim 1, wherein the code comprises an identification code, and the circuitry is further configured to determine whether the watermarked title data is an unauthorized copy of the title data based on the code.

6. The device of claim 1, wherein the computer-readable medium is adapted to store watermarked title data comprising a full-length movie title data, audio title data or software title data.

7. A method of processing title data watermarked with a code, comprising:
   receiving watermarking information associated with the watermarked title data, the watermarking information identifying a plurality of placement locations and a number to frequency modulation relationship at each of the plurality of placement locations;
   demodulating the watermarked title data at each of the plurality of placement locations based on the number to frequency modulation relationship;
   generating the code from the demodulated watermarked title data; and
   outputting a verification indication based in part on the generated code.

8. The method of claim 7, wherein the method further comprises communicating with a central database over a network to verify the generated code.

9. The method of claim 7, wherein the watermarking information comprises a correlation map and a watermarking key.

10. The method of claim 7, further comprising reading the watermarked title data from a CD or DVD.

11. The method of claim 7, wherein the code comprises a customer identification code, and the method further comprises verifying that the user of the watermarked title data is a customer authorized to use title data.

12. The method of claim 7, wherein the code comprises an identification code, and the method further comprises determining whether the watermarked title data is an unauthorized copy of the title data.

13. The method of claim 7, wherein the watermarked title data comprises a full-length movie title data, audio title data or software title data.

* * * * *